US011926967B2

(12) United States Patent
Zha et al.

(10) Patent No.: US 11,926,967 B2
(45) Date of Patent: Mar. 12, 2024

(54) WATER-BASED COATINGS FOR CELLULOSIC SUBSTRATES

(71) Applicant: SUN CHEMICAL CORPORATION, Parsippany, NJ (US)

(72) Inventors: Yongping Zha, Berkeley Heights, NJ (US); Vanessa Gordon, Montvale, NJ (US); Philippe Schottland, Sparta, NJ (US)

(73) Assignee: SUN CHEMICAL CORPORATION, Parsippany, NJ (US)

( * ) Notice: Subject to any disclaimer, the term of this patent is extended or adjusted under 35 U.S.C. 154(b) by 339 days.

(21) Appl. No.: 16/868,856

(22) Filed: May 7, 2020

(65) Prior Publication Data
US 2020/0263359 A1 Aug. 20, 2020

Related U.S. Application Data

(63) Continuation-in-part of application No. PCT/US2019/014261, filed on Jan. 18, 2019, and a continuation-in-part of application No. PCT/US2018/060142, filed on Nov. 9, 2018, said application No. PCT/US2019/014261 is a continuation-in-part of application No. PCT/US2018/060142, filed on Nov. 9, 2018.

(60) Provisional application No. 62/585,034, filed on Nov. 13, 2017.

(51) Int. Cl.
| D21H 19/58 | (2006.01) |
| C09D 7/20 | (2018.01) |
| C09D 7/40 | (2018.01) |
| C09D 7/61 | (2018.01) |
| C09D 7/65 | (2018.01) |
| C09D 133/12 | (2006.01) |
| D21H 19/40 | (2006.01) |

(52) U.S. Cl.
CPC .............. *D21H 19/58* (2013.01); *C09D 7/20* (2018.01); *C09D 7/61* (2018.01); *C09D 7/65* (2018.01); *C09D 7/68* (2018.01); *C09D 7/69* (2018.01); *C09D 133/12* (2013.01); *D21H 19/40* (2013.01)

(58) Field of Classification Search
CPC ........................................................ C09D 7/61
See application file for complete search history.

(56) References Cited

U.S. PATENT DOCUMENTS

| 4,340,622 A * | 7/1982 | Kik | B05D 7/14 |
| | | | 427/325 |
| 4,859,723 A * | 8/1989 | Kyminas | C08K 3/346 |
| | | | 524/440 |
| 5,385,967 A | 1/1995 | Bauer et al. | |
| 5,942,320 A * | 8/1999 | Miyake | C08J 7/043 |
| | | | 428/425.5 |
| 6,348,536 B1 | 2/2002 | Fourty et al. | |
| 6,441,080 B1 | 8/2002 | Berube | |
| 6,447,899 B1 | 9/2002 | Dutton et al. | |
| 6,727,342 B1 | 4/2004 | Bastioli et al. | |
| 7,427,444 B2 | 9/2008 | Rabasco et al. | |
| 8,637,126 B2 | 1/2014 | Cleveland et al. | |
| 8,771,835 B2 | 7/2014 | Iyengar et al. | |
| 8,852,335 B2 | 10/2014 | Tolibas-Surlock et al. | |
| 9,068,105 B2 | 6/2015 | Vonfelden et al. | |
| 9,340,927 B2 | 5/2016 | Heiskanen et al. | |
| 9,358,576 B2 | 6/2016 | Anderson et al. | |
| 9,637,866 B2 | 5/2017 | Tilton | |
| 9,732,474 B2 | 8/2017 | Koenig et al. | |
| 2006/0222845 A1 * | 10/2006 | Deng | A01N 25/34 |
| | | | 428/522 |
| 2010/0136355 A1 | 6/2010 | Van Den Abbeele Henk | |
| 2012/0302660 A1 | 11/2012 | Stanssens | |
| 2014/0186644 A1 | 7/2014 | Dellinger et al. | |
| 2014/0272163 A1 | 9/2014 | Tilton | |
| 2014/0272352 A1 | 9/2014 | Tilton | |
| 2014/0274633 A1 | 9/2014 | Tilton | |
| 2015/0111011 A1 | 4/2015 | Hoekstra et al. | |
| 2015/0258772 A1 | 9/2015 | Jin et al. | |
| 2015/0274350 A1 | 10/2015 | Seyffer et al. | |
| 2015/0298438 A1 | 10/2015 | Nevalainen et al. | |
| 2016/0145806 A1 | 5/2016 | Rhee | |
| 2016/0222592 A1 | 8/2016 | Muller et al. | |
| 2017/0120655 A1 | 5/2017 | Rueckert | |
| 2017/0174947 A1 | 6/2017 | Kato et al. | |
| 2017/0198171 A1 | 7/2017 | Deak et al. | |
| 2018/0245291 A1 | 8/2018 | Pang et al. | |
| 2018/0312711 A1 | 11/2018 | Zha et al. | |

FOREIGN PATENT DOCUMENTS

| CA | 2394735 | 7/2012 |
| CN | 1489613 A | 4/2004 |

(Continued)

OTHER PUBLICATIONS

Extended European Search Report issued in counterpart EP Application No. EP 19 88 0947, dated Oct. 6, 2021.

(Continued)

*Primary Examiner* — Vickey Nerangis
(74) *Attorney, Agent, or Firm* — Luke Sande

(57) ABSTRACT

The present invention provides water-based coatings that provide liquid resistance when applied to various substrates. In some embodiments, more than one layer of coatings can be applied, using multiple coating stations. The coatings are particularly suitable for cellulosic substrates such as paper or paper board. In addition to liquid resistance, the coatings have good heat sealability, and are resistant to roll blocking. Preferably, the coatings are recyclable and/or repulpable with the substrates to which they are applied. The coating compositions comprise one or more polymer binders, and one or more particles. Preferably, at least one polymer binder has a glass transition temperature (Tg) less than 10° C. Preferably, at least one polymer binder has a heat seal onset temperature of less than 200° C. Preferably, at least one particle has a mean particle size greater than 4 μm. It is also preferable that the particles have a melting point greater than 60° C.

18 Claims, No Drawings

(56) References Cited

FOREIGN PATENT DOCUMENTS

| | | |
|---|---|---|
| CN | 101910332 A | 12/2010 |
| CN | 103282581 A | 9/2013 |
| CN | 107548358 A | 1/2018 |
| EP | 0 499 578 A1 | 8/1992 |
| EP | 1246969 | 1/2005 |
| JP | 2002-002792 | 1/2002 |
| WO | WO 94/26513 A1 | 11/1994 |
| WO | WO 96/05054 A1 | 2/1996 |
| WO | WO 2008/141771 | 11/2008 |
| WO | WO 2011/110498 | 9/2011 |
| WO | WO 2015/020749 | 2/2015 |
| WO | WO 2016/183314 | 11/2016 |
| WO | WO 2017/074991 A1 | 5/2017 |
| WO | WO 2017/152217 | 9/2017 |
| WO | WO 2017/210606 | 12/2017 |
| WO | WO 2018/081764 A1 | 3/2018 |

OTHER PUBLICATIONS

Anonymous: "Flexography", Aug. 28, 2021, pp. 1-8, XP055844769, Retrieved from the Internet: URL:https://en.wikipedia.org/wiki/Flexography, [retrieved on Sep. 27, 2021].

Olsson Robert: "Some aspects on flexographic ink-paper and paperboard coating interaction (Dissertation)" Jan. 1, 2007, pp. 1-66, XP055844774, SE-651 87 Karlstad, Sweden, Retrieved from the Internet: URL:https://www.diva-portal.org/smash/get/ diva2:5047/fulltext01.pdf [retrieved on Sep. 27, 2021].

Frank Ben: "Water absorptiveness of sized (non-bibulous) paper, paperboard, and corrugated fiberboard (Cobb test) (Proposed revision of T 441 om-09)", Jan. 1, 2013, pp. 1-18, XP055844791, Retrieved from the Internet: URL:https://www.tappi.org/content/tag/sarg/t441.pdf [retrieved on Sep. 27, 2021].

Riekke Anne: "Oil and Grease Resistant Paper—Board—Factors Affecting Barrier Properties and an Evaluation of the Test Methods (Thesis)", 9 Aug. 1, 2019, pp. 1-83, XP055844801, Retrieved from the Internet: URL:https://trepo.tuni.fi/bitstream/handle /10024/116429/RiekkiAnne.pdf?sequence=2 [retrieved on Sep. 27, 2021].

Anonymous: "NeoCryl A-2092, product data sheet", Nov. 1, 2020, pp. 1-1, XP055845098, Retrieved from the Internet: URL:https://www.dsmcoatingresins.com [retrieved on Sep. 28, 2021].

Anonymous: "Joncryl DFC 3050-E (Technical data)", 9, Sep. 22, 2008, pp. 1-4, XP055845095, Retrieved from the Internet: URL:http://www.xtgchem.cn/upload/20110629124917.pdf [retrieved on Sep. 28, 2021].

Henned Saade et al: "Biocompatible and Biodegradable Ultrafine Nanoparticles of Poly(Methyl Methacrylate-co-Methacrylic Acid) Prepared via Semicontinuous Heterophase Polymerization: Kinetics and Product Characterization", International Journal of Polymer Science, vol. 2016, Jan. 1, 2016, p. 7674620, XP055713142, ISSN: 1687-9422, DOI: 10.1155/2016/7674620.

Rakesh Singh et al: "Biodegradation of Styrene-Butadiene-Styrene Copolymer via Sugars Attached to the Polymer Chain", Advances in Materials Physics and Chemistry, vol. 03, No. 02, Jan. 1, 2013, pp. 112-118, XP055671650, ISSN: 2162-531X, DOI: 10.4236/ampc.2013.32017.

Anonymous: "Surfynol DF-695, Defoamer/deaerator for waterborne formulations", Sep. 27, 2021, pp. 1-1, XP055845320, Retrieved from the Internet: URL:https://www.productcenter.coating-additives.com/pdf/daten/engl/SURFYNOL DF-695.pdf [retrieved on Sep. 28, 2021].

Anonymous: "Hydropalat WE 3475/3477/3485/3486", Jan. 1, 2021, pp. 1-2, XP055845321, Retrieved from the Internet: URL:https://dispersions-resins-products.basf.us/files/brochures/HydropalatWE3475_ValueCard.pdf [retrieved on Sep. 28, 2021] * the whole document.

Anonymous: "Hydrocer 357, Rub and Abrasion Resistance (Technical data)", Oct. 23, 2003, pp. 1-1, XP055845092, Retrieved from the Internet: URL:http://beta.rodpub.com/uploads/739000Hydrocer-357.pdf [retrieved on Sep. 28, 2021] * the whole document *.

European Search Report issued in counterpart EP Application No. EP 18 87 7281, dated Jul. 14, 2021.

Australian Examination Report issued in counterpart AU application No. 2019375832, dated May 27, 2021.

Communication pursuant to Article 94 issued in counterpart EP Application No. EP 19 88 0947.7, dated Jun. 1, 2022.

Chinese Office Action issued in counterpart CN Application No. 201980071766.X, dated Jun. 6, 2022 with English Summary.

Philippines Office Action issued in counterpart PH Application No. 1/2020/550571, dated May 27, 2022.

Chinese Office Action issued in counterpart CN Application No. 201880073643.5, dated Jun. 2, 2022 with English Summary.

Chinese Office Action issued in counterpart CN Application No. 201980071766.X, dated Dec. 29, 2021 with English Summary and Machine Translation.

Chinese Office Action issued in counterpart CN Application No. 201880073643.5, dated Dec. 3, 2021 with English Summary and Machine Translation.

Indian Office Action issued in counterpart IN Application No. 202047017676, dated Mar. 9, 2022.

International Search Report issued in International Application No. PCT/US2018/060142, dated Jan. 24, 2019.

Written Opinion of the International Searching Authority issued in International Application No. PCT/US2018/060142, dated Jan. 24, 2019.

International Preliminary Report on Patentability (Chapter II of the Patent Cooperation Treaty) issued in International Application No. PCT/US2018/060142, dated Feb. 21, 2020.

International Search Report issued in International Application No. PCT/US2019/014261, dated Apr. 8, 2019.

Written Opinion of the International Searching Authority issued in International Application No. PCT/US2019/014261, dated Apr. 8, 2019.

International Preliminary Report on Patentability (Chapter II of the Patent Cooperation Treaty) issued in International Application No. PCT/US2019/014261, dated Mar. 2, 2020.

Communication pursuant to Article 94 (3) EPC issued in counterpart EP Application No. EP 19 880 947.7, dated Oct. 24, 2022.

Chinese Office Action issued in counterpart CN Application No. 201980071766.X, dated Sep. 2, 2022 with English Summary.

Philippines Office Action issued in counterpart CN Application No. /2021/550845, dated Jul. 14, 2022.

* cited by examiner

WATER-BASED COATINGS FOR CELLULOSIC SUBSTRATES

CROSS-REFERENCE TO RELATED APPLICATIONS

This application is a Continuation-in-Part of (1) International Application No. PCT/US2018/60142, filed 9 Nov. 2018, which claims priority to U.S. Provisional Application No. 62/585,034, filed 13 Nov. 2017; and (2) a Continuation-in-Part of International Application No. PCT/US2019/14261, filed 18 Jan. 2019, which is a Continuation-in-Part of International Application No. PCT/US2018/60142, filed 9 Nov. 2018. This Continuation-in-Part is being filed under 35 U.S.C. § 111(a). The disclosure of the prior applications is hereby incorporated by herein in its entirety.

FIELD OF THE INVENTION

The present invention is related to water-based polymer coatings for surface treatment of cellulose-based substrates. The present invention is also related to methods of preparing and using the water-based polymer coatings, and products made from the surface-treated cellulose-based substrates.

BACKGROUND

Cellulose-based packaging materials for containers and product packages, such as packaging paper or board, are usually provided with a polymeric coating that makes the materials liquid-tight and allows forming the container or package by heat sealing. Typical articles made from polymer coated paper or board are liquid packages and disposable tableware, such as drinking cups. Low-density polyethylene (LDPE) is widely used for coating due to its good liquid barrier properties (i.e. resistance to water, tea, coffee, oil, grease, etc.) and good heat-sealability.

However, LDPE will not disintegrate during the repulping process upon recycling of paper and board, and creates problems in recovering the useful fiber from the package. In addition, LDPE is not biodegradable, which means that it will remain in the environment for many years, and negatively impact the ecosystem. Presently, nearly all of these packages are ultimately discarded into landfills or incinerated, which raises issues with respect to the environment and public health.

In addition, the coatings used for packaging materials should exhibit good heat seal strength, and resistance to roll block. However, these properties are conflicting. When currently available coatings provide good heat seal strength, they often exhibit undesirable blocking. On the other hand, when currently available coatings provide good block resistance, the heat seal strength is often inadequate.

WO 2015/020749 and WO 2016/183314 disclose aqueous coating compositions comprising (meth)acrylic copolymers, inorganic fillers, and which may comprise styrene-butadiene copolymers. The glass transition value and acid number of the (meth)acrylic copolymers and styrene-butadiene copolymers are not disclosed. The method used to determine particle size of the inorganic fillers is not described, therefore it is unclear what particle size inorganic fillers are used. These aqueous coatings are one of two coatings, and are not used alone.

U.S. Pat. No. 9,732,474 discloses hydrophobic coating compositions comprising (meth)acrylic copolymers, styrene-butadiene copolymers, and inorganic fillers. The glass transition value and acid number of the (meth)acrylic copolymers and styrene-butadiene copolymers are not disclosed. Nor is the particle size of the inorganic fillers disclosed.

WO 2018/081764 discloses aqueous coating compositions comprising (meth)acrylic copolymers, styrene-butadiene copolymers, inorganic fillers, and large particle wax. The particle size of the inorganic fillers is not disclosed. The compositions of WO 2018/081764 must contain large particle wax.

WO 2017/210606 discloses coating compositions comprising at least one acid-rich copolymer, and at least one acid-free copolymer, and inorganic fillers. The particle size of the inorganic fillers is not disclosed.

CA 2394735 (English counterpart of EP 1246969) describes incorporation of fillers into paperboard substrates to improve the edge wick sizing of the paperboard substrates intended to be used as liquid containers.

U.S. Pat. No. 7,427,444 describes a cellulosic product (e.g. paper or paperboard) with a coating that is an emulsion polymerized ethylene-vinyl acetate polymer. EP 1498544 discloses coating compositions comprising aqueous-based semi-crystalline vinyl acetate-ethylene polymer emulsions, useful for coating cellulosic substrates.

U.S. Pat. No. 8,771,835 discloses biodegradable high barrier packaging comprising a coating having nano pigments and one or more binders, a metallized film layer, and a bonding layer.

JP 2002-002792 discloses double-structure paper cups, wherein an alcoholic beverage is enclosed in a synthetic resin bag in advance, then stored in a paper cup.

U.S. Pat. No. 6,727,342 discloses biodegradable polyester resins useful as coatings to provide water vapor barrier properties to substrates.

U.S. Pat. No. 8,637,126 discloses biodegradable laminates including biodegradable polymers. The laminates have oxygen and moisture barrier properties. The biodegradable laminates can be formed by extrusion.

U.S. Pat. No. 8,852,335 discloses containers made of biodegradable plant fiber based structural material. The inner surface of the containers are coated with a fluid resistant biodegradable film or sprayable resin.

U.S. Pat. No. 9,068,105 describes a biodegradable heat-sealing coating comprising a barrier polymer, a soft polymer and an adhesive. The barrier polymer may be stearic acid modified polyethylene terephthalate (PET). The soft polymer may be tall oil modified PET, and the adhesive layer may be a vinyl acetate/ethylene copolymer.

U.S. Pat. No. 9,358,576 discloses paper substrates having a print receptive layer, over which is applied a water vapor barrier coating. The water vapor barrier comprises one or more energy-curable monomers.

US 2015/0274350 describes paper or cardboard packaging produced from mineral oil contaminated (recycled) paper. The packaging material includes a barrier layer comprising an aqueous polymer dispersion.

US 2015/0111011 discloses a paper board substrate coated on at least one surface with a water barrier coating, as well as other surface coatings and a heat sealable layer. The water barrier coating comprises at least one polymer having a melting point of at least 120° C.

US 2016/0222592 discloses a packaging material that includes a starch-based barrier coating. The barrier coating optionally has a filler component.

WO 2017/152217 describes a material composition with enhanced barrier properties. The material composition includes a porous substrate having a void fraction, wherein the void fraction is at least partially filled with an inorganic precipitate.

U.S. Pat. No. 9,340,927 describes polymer-coated heat-sealable liquid packaging material, wherein the raw edges are resistant to liquids. The fibre base of the board contains hydrophobic size containing alkyl ketene dimers.

U.S. Pat. No. 9,637,866 and US 2014/0274633 disclose recyclable and repulpable composite material structures suitable for fabricating storage articles. The composite material structures comprise one or more fiber containing layers, and one or more mineral containing layers. A thermoplastic bonding agent fixes the mineral particles in place in the mineral containing layers.

US 2014/0186644 discloses biodegradable and compostable coatings which comprise a cellulose ester, shellac, and a rosin, and optionally comprise a wax, one or more plasticizers, or one or more release agents. Also disclosed are biodegradable and compostable coatings comprising a cellulose ester, rosin, and one or more waxes.

US 2015/0298438 describes a polymer coating prepared by coextruding onto a fibrous base an inner polymer layer containing a blend of low density polyethylene (LDPE) and a second polyethylene selected from linear low-density polyethylene (LLDPE) and high-density polyethylene (HDPE); and an out layer comprising HDPE.

US 2016/0145806 discloses a method of manufacturing an environmentally friendly paper coating that is an aqueous dispersion prepared by mixing amines, alkali metal hydroxide, and ammonia water with each of an ethylene-acrylic acid copolymer or an ethylene (meth)acrylic copolymer or a mixture of these polymers, and neutralizing the mixture in an aqueous medium. A silica powder may be added to the aqueous dispersion.

WO 2008/141771 discloses a composition for the surface treatment of paper, comprising a binder with a glass transition temperature of less than 30° C., and a talc with an average particle size between 500 and 2000 nm, an aspect ratio higher than 30, and a specific surface area between 10 and 20 $m^2/g$. Suitable binders include styrene butadiene latex, polyurethane, polyester, or polyethylene acrylate dispersions.

WO 2011/110498 describes a heat sealable substrate comprising a basic layer and a coating layer containing a cyclic imide. The coating optionally comprises other binders, fillers, and other additives.

U.S. Pat. No. 6,348,536 discloses a process for treating a lamella-type mineral in the form of particles arrange in stacks of sheets, to obtain a functional filler for a polymer material. The filler so obtained is a talcum powder that can be incorporated into a thermoplastic material as a functional filler to increase the flexural modulus.

US 2018/0245291 discloses aqueous heat sealing coatings comprising a binder with a relatively high glass transition temperature and a mineral filler which is either clay or calcium carbonate. Styrene acrylate binders are disclosed.

Although some aqueous coatings for cellulosic substrates have been developed, there is still a need for water-based barrier coatings which provide the same effects as LDPE that is currently used for manufacturing paper containers. Moreover, there is a need for coatings that provide both good heat seal strength, and good block resistance, which are often conflicting properties. Preferably, such coatings would be suitable to apply by various coating methods, such as by flexographic or gravure printing press, blade coaters, air knife coaters, rod coaters, curtain coaters, digital printing, inkjet printing, screen printing, roll coating, dip coating, spray coating, intaglio, etc. In addition, there is a need for coatings that are suitable for recycling, and are re-pulpable during the recycling process. Ideally, the repulpable coatings will also be formulated such that they do not interfere with the compostability of the cellulosic substrate in either a residential and/or an industrial setting.

BRIEF SUMMARY OF THE INVENTION

The present invention provides water-based coating compositions that are suitable for application to the surface of cellulosic substrates, imparting liquid resistance to the cellulosic substrate. The coatings have both good heat seal strength, and roll block resistance. In addition, the water-based coatings are environmentally friendly, being recyclable and repulpable. Such repulpable coatings typically do not interfere with the compostability if they have been formulated without heavy metals and represent less than about 10 wt %, and preferably less than about 5 wt %, of the cellulosic substrate.

In a particular aspect, the present invention provides a water-based coating composition, comprising:
  a) one or more polymer binders, in an amount of 25 wt % to 99 wt %, on a solids weight basis; and
  b) one or more particles, in an amount of 0.1 wt % to 50 wt %, on a solids weight basis;
  wherein at least one polymer binder has a glass transition temperature (Tg) less than 10° C.;
  wherein at least one polymer binder has a heat seal onset temperature of less than 200° C.; and
  wherein at least one particle has an average particle size of greater than 4 µm.

In another aspect, the present invention provides a method of coating a substrate with the water-based coatings of the present invention.

In one aspect, the present invention provides a method of coating a substrate, comprising:
  a) providing a substrate;
  b) applying two or more coatings to the substrate via flexography;
  wherein more than one coating station is used for applying the coatings;
  wherein the same or a different coating may be applied at each station;
  wherein at least one coating is a water-based coating (A) comprising:
    i) one or more polymer binders, in an amount of 25 wt % to 99 wt %, on a solids weight basis; and
    ii) one or more particles, in an amount of 0.1 wt % to 50 wt %, on a solids weight basis;
    wherein at least one polymer binder has a glass transition temperature (Tg) of less than 10° C.;
    wherein at least one polymer binder has a heat seal onset temperature of less than 200° C.; and
    wherein at least one particle has an average particle size of greater than 4 µm.

In one embodiment, the present invention provides a substrate coated by the method of the present invention.

In yet another aspect, the present invention provides articles, such as packaging articles, comprising the water-based coatings of the present invention.

These and other objects, advantages, and features of the invention will become apparent to those persons skilled in the art upon reading the details of the formulations and methods as more fully described below.

DETAILED DESCRIPTION OF THE INVENTION

It is to be understood that the foregoing general description and the following detailed description are exemplary and explanatory only, and are not restrictive of any subject matter claimed.

Headings are used solely for organizational purposes, and are not intended to limit the invention in any way.

Unless otherwise defined, all technical and scientific terms used herein have the same meaning as is commonly understood by one of skill in the art to which the inventions belong. All patents, patent applications, published applications and publications, websites and other published materials referred to throughout the entire disclosure herein, unless noted otherwise, are incorporated by reference in their entirety for any purpose. Although any methods and materials similar or equivalent to those described herein can be used in the practice or testing of the present invention, the preferred methods are described.

Disclosed herein are inventive water-based barrier coatings which provide the same effect as LDPE currently used for manufacturing paper containers, and yet can be easily repulped and recycled. Such coatings impart good water, oil, grease, and other liquid resistance to various substrate materials, such as paper, board, and polymeric materials; have heat sealability; and exhibit minimal roll blocking. Also disclosed herein is a process of preparing the coatings. Also disclosed are articles to which the coatings have been applied in order to impart liquid resistance, heat sealability, and roll block resistance, and a process for preparing such products.

In a particular aspect, the present invention provides a water-based coating composition, comprising:
a) one or more polymer binders, in an amount of 25 wt % to 99 wt %, on a solids weight basis; and
b) one or more particles, in an amount of 0.1 wt % to 50 wt %, on a solids weight basis;
wherein at least one polymer binder has a glass transition temperature (Tg) less than 10° C.;
wherein at least one polymer binder has a heat seal onset temperature of less than 200° C.; and
wherein at least one particle has an average particle size of greater than 4 µm.

In another aspect, the present invention provides a method of coating a substrate with the water-based coatings of the present invention.

In one aspect, the present invention provides a method of coating a substrate, comprising:
a) providing a substrate;
b) applying two or more coatings to the substrate via flexography;
wherein more than one coating station is used for applying the coatings;
wherein the same or a different coating may be applied at each station;
wherein at least one coating is a water-based coating (A) comprising:
i) one or more polymer binders, in an amount of 25 wt % to 99 wt %, on a solids weight basis; and
ii) one or more particles, in an amount of 0.1 wt % to 50 wt %, on a solids weight basis;
wherein at least one polymer binder has a glass transition temperature (Tg) of less than 10° C.;
wherein at least one polymer binder has a heat seal onset temperature of less than 200° C.; and
wherein at least one particle has an average particle size of greater than 4 µm.

Definitions

In this application, the use of the singular includes the plural unless specifically stated otherwise. As used herein, the singular forms "a," "an" and "the" are intended to include the plural forms as well, unless the context clearly indicates otherwise.

In this application, the use of "or" means "and/or" unless stated otherwise.

As used herein, the terms "comprises" and/or "comprising" specify the presence of the stated features, integers, steps, operations, elements, and/or components, but do not preclude the presence or addition of one or more other features, integers, steps, operations, elements, components, and/or groups thereof. Furthermore, to the extent that the terms "includes," "having," "has," "with," "composed," "comprised" or variants thereof are used in either the detailed description or the claims, such terms are intended to be inclusive in a manner similar to the term "comprising."

As used herein, ranges and amounts can be expressed as "about" a particular value or range. "About" is intended to also include the exact amount. Hence "about 5 percent" means "about 5 percent" and also "5 percent." "About" means within typical experimental error for the application or purpose intended.

It is to be understood that wherein a numerical range is recited, it includes all values within that range, and all narrower ranges within that range, whether specifically recited or not.

As used herein, the terms "(meth)acrylate," "(meth) acrylic acid," or "acrylate" include both acrylate and methacrylate compounds, and both acrylic acid and methacrylic acid, unless specified otherwise.

As used herein, the term "polymer" includes both homo- and co-polymers.

As used herein, the terms "water-based coating compositions," "water-based coatings," "coatings," "coating compositions," "compositions" and the like are used interchangeably. As used herein, coatings and related terms include inks.

As used herein, "substrate" means any surface or object to which an ink or coating can be applied. Substrates include, but are not limited to, cellulose-based substrates, paper, paperboard, fabric, leather, textiles, felt, concrete, masonry, stone, plastic, plastic or polymer film, glass, ceramic, metal, wood, composites, combinations thereof, and the like. Substrates may have one or more layers of metals or metal oxides, or other inorganic materials.

As used herein, the term "article" or "articles" means a substrate or product of manufacture. Examples of articles include, but are not limited to: substrates such as cellulose-based substrates, paper, paperboard, plastic, plastic or polymer film, glass, ceramic, metal, composites, and the like; and products of manufacture such as publications (e.g. brochures), labels, and packaging materials (e.g. cardboard sheet or corrugated board), containers (e.g. bottles, cans), a polyolefin (e.g. polyethylene or polypropylene), a polyester (e.g. polyethylene terephthalate), a metalized foil (e.g. laminated aluminum foil), metalized polyester, a metal container, and the like.

Throughout this disclosure, all parts and percentages are by weight (wt % or mass % based on the total weight) and all temperatures are in ° C. unless otherwise indicated.

As used herein, "recyclable" means that the waste of material (test or production) can be converted into new materials or objects, using a standard process.

As used herein, "repulpable" refers to the test material undergoing the operation of re-wetting and fiberizing for subsequent sheet formation, using a standard process.

As used herein, "median diameter $D_{50}$" is understood to mean a diameter such that 50% of the particles by weight have a size less than the said diameter. In certain embodiments, the $D_{50}$ will be referred to as "S-$D_{50}$" when measured by the SediGraph Method, and as "L-$D_{50}$" when measured by laser diffraction.

As used herein, "cutoff diameter $D_{95}$" is understood to mean a diameter such that 95% by weight of the particles have a size less than the said diameter. In certain embodiments, the $D_{95}$ will be referred to as "S-$D_{95}$" when measured by the SediGraph Method, and as "L-$D_{95}$" when measured by laser diffraction.

As used herein, "acid value" is the weight in milligrams of KOH required to neutralize the pendant carboxylate groups in one gram of polymer.

As used herein, "Tg" or "glass transition temperature" is the temperature range where a thermosetting polymer changes from a hard, rigid or "glassy" state to a more pliable, compliant or "rubbery" state.

As used herein, "Tm" or "melting point" is the temperature at which a substance changes from a solid to a liquid phase.

As used herein, "drying" is understood to mean any operation tending to reduce the quantity of water (and solvent, if any) in the coating. The drying may be carried out by heating.

Coating Compositions and Use Thereof

The coating compositions described herein comprise one or more polymer binders, and one or more particles. Preferably, at least one polymer binder has a glass transition temperature (Tg) lower than 10° C. Preferably, at least one polymer binder has a heat seal onset temperature of less than 200° C. Preferably, the particles have a mean particle size over 4 μm. The particles preferably have a melting point (Tm) over 60° C.

One, or more than one, coating may be applied to the substrate. The layers may be the same or different coatings. In certain embodiments, when more than one coating is applied, multiple coating/printing stations are used for applying the coatings. In that case, each station could use the same coating, or each station may use a different coating. Advantageously, the coatings may be applied via flexography, using multiple stations. The coatings impart good liquid resistance to the substrate, including resistance to water, oil, grease, coffee, tea, soda, etc.

In certain embodiments, the coating compositions described herein comprise, on a solid weight basis, 25-99%, preferably 35-95%, and more preferably 50-95% one or more polymer binders with at least one glass transition temperature (Tg) lower than 10° C., preferably lower than 0° C.; 25-99%, preferably 35-95%, and more preferably 50-95% one or more polymer binders with a heat seal onset temperature of less than 200° C., preferably of less than 120° C., which can each independently be the same polymer as a polymer having a Tg less than 10° C., or a different polymer; and 0.1-50%, preferably 5-20% of one or more particles with mean particle size over 4 μm, preferably over 8 μm, and melting point (Tm) over 60° C., preferably over 100° C. The particles include, but are not limited to, inorganic fillers such as talc or calcium carbonate, and organic waxes such as high density polyethylene (HDPE) or N,N'-ethylene bis-stearamide. The shape of particles can be either lamellar or spherical.

The water-based polymer coating can have a dry coat weight of 2 g/m² to 40 g/m². The present invention also relates to coated substrates comprising cellulose-substrates with water-based polymer coatings. The present disclosure also relates to paper cups and other containers comprising the coated substrates. Methods of making the paper containers and coated substrates are also disclosed herein. This disclosure also relates, in some embodiments, to paper containers, especially paper cups comprising cellulose-based substrates coated with the water-based polymer coating described herein.

The polymer binders of the present invention can be a single polymer, or a blend of polymers. Suitable polymers include, but are not limited to, acrylic-based polymers, styrene-based polymers, silicone-based polymers, vinyl polymers, polyesters, polyethers, polycarbonates, and the like. Preferably, at least one polymer of the polymer binder has a Tg less than 10° C., and more preferably less than 0° C. Preferably at least one polymer of the polymer has a heat seal onset temperature less than 200° C., more preferably less than 120° C.

In some embodiments, the polymer binder of the present invention includes a polymer dispersion or solution containing one or more acrylic-based polymers. The acrylic-based polymers may include an acrylate homo- or co-polymer that is the polymerization product of one or more acrylate monomers, such as alkyl, aryl, alkaryl (meth)acrylates, and/or esters of acrylic and methacrylic acid, with alcohols which contain at least one further heteroatom in addition to the oxygen atom in the alcohol group and/or which contain an aliphatic or aromatic ring. Exemplary acrylate monomers include, but are not limited to, methyl methacrylate, methyl acrylate, n-butyl acrylate, ethyl acrylate, 2-ethylhexyl acrylate, 2-ethoxyethyl acrylate, 2-butoxyethyl (meth)acrylate, dimethylaminoethyl (meth)acrylate, diethylaminoethyl (meth)acrylate, cyclohexyl (meth)acrylate, phenylethyl (meth)acrylate, phenylpropyl (meth)acrylate, acrylates of heterocyclic alcohols, e.g., furfuryl (meth)acrylate, and combinations thereof. In addition, the (meth)acrylic copolymer can include pure (meth)acrylic copolymer, ethylene (meth)acrylic copolymer, and styrene (meth)acrylic copolymer which comprise at least one of (meth)acrylic acid, itaconic acid, methyl (meth)acrylate, ethyl (meth)acrylate, n-butyl (meth)acrylate, isobutyl (meth)acrylate, tert-butyl (meth)acrylate, 2-ethylhexyl (meth)acrylate, (meth)acrylamide, (meth)acrylonitrile, and hydroxyethyl (meth)acrylate, etc.

The acrylate homo- or co-polymers in the acrylic-based polymer may also include other polymerized monomers such as those having olefinic double bond(s) capable of undergoing free radical polymerization, including but not limited to vinyl ethers (such as methyl vinyl ether, ethyl vinyl ether, butyl vinyl ether and vinyl ethers with longer carbon-chain lengths), vinyl esters (such as vinyl acetate and esters based on versatic acid), vinylaromatic compounds, nitriles, vinyl halides, hydrocarbons, and the like, such as vinyl laurate, vinyl stearate, vinyl propionate, vinyl acetate, vinyltoluene, α- and p-styrene, α-butylstyrene, 4-n-butylstyrene, 4-n-decylstyrene, styrene, chlorine-, fluorine- or bromine-substituted ethylenically unsaturated compounds, vinyl chloride, vinylidene chloride, 1,3-alkenes (such as butadiene, isoprene and chloroprene), and combinations thereof.

In some embodiments, the acrylic-based polymer may contain one or more different styrenic monomers. Suitable styrenic monomers for use include those having a substituted or unsubstituted phenyl group attached to an ethylene moiety. Styrenic monomers include, but are not limited, to styrene, α-methylstyrene, p-methylstyrene, t-butylstyrene, o-chlorostyrene, vinyl pyridine, and combinations thereof.

In some embodiments, the acrylic-based polymer may contain at least one carboxylic acid functional group in the compound. Illustrative carboxylic acid functional monomers include, but are not limited to acrylic acid, methacrylic acid, itaconic acid, crotonic acid, maleic acid and fumaric acid. The term "carboxylic acid functional monomers" also includes the anhydride derivatives of the carboxylic acid functional monomers listed above. The carboxylic acid functional monomers may include one, two, three, four, or more, different carboxylic acid functional monomers.

In some embodiments, the polymer binders comprise at least one polymer with a Tg of less than 10° C. For example, at least one polymer may have a Tg of less than 5° C., or less than 1° C. Preferably, at least one polymer has a Tg less than 0° C.

The coating compositions typically comprise about 25 wt % to about 99 wt % polymer binders, on a solid weight basis. Preferably, the coating compositions comprise about 35 wt % to about 95 wt %, and more preferably 50 wt % to about 95 wt % polymer binders, on a solid weight basis. For example, the coating compositions may comprise polymers binders in an amount of about 25 wt % to about 99 wt %; or about 25 wt % to about 95 wt %; or about 25 wt % to about 90 wt %; or about 25 wt % to about 85 wt %; or about 25 wt % to about 80 wt %; or about 25 wt % to about 75 wt %; or about 25 wt % to about 70 wt %; or about 25 wt % to about 65 wt %; or about 25 wt % to about 60 wt %; or about 25 wt % to about 55 wt %; or about 25 wt % to about 50 wt %; or about 25 wt % to about 45 wt %; or about 25 wt % to about 40 wt %; or about 25 wt % to about 35 wt %; or about 25 wt % to about 30 wt %; or about 30 wt % to about 99 wt %; or about 30 wt % to about 95 wt %; or about 30 wt % to about 90 wt %; or about 30 wt % to about 85 wt %; or about 30 wt % to about 80 wt %; or about 30 wt % to about 75 wt %; or about 30 wt % to about 70 wt %; or about 30 wt % to about 65 wt %; or about 30 wt % to about 60 wt %; or about 30 wt % to about 55 wt %; or about 30 wt % to about 50 wt %; or about 30 wt % to about 45 wt %; or about 30 wt % to about 40 wt %; or about 30 wt % to about 35 wt %; or about 35 wt % to about 99 wt %; or about 35 wt % to about 95 wt %; or about 35 wt % to about 90 wt %; or about 35 wt % to about 85 wt %; or about 35 wt % to about 80 wt %; or about 35 wt % to about 75 wt %; or about 35 wt % to about 70 wt %; or about 35 wt % to about 65 wt %; or about 35 wt % to about 60 wt %; or about 35 wt % to about 55 wt %; or about 35 wt % to about 50 wt %; or about 35 wt % to about 45 wt %; or about 35 wt % to about 40 wt %; or about 40 wt % to about 99 wt %; or about 40 wt % to about 95 wt %; or about 40 wt % to about 90 wt %; or about 40 wt % to about 85 wt %; or about 40 wt % to about 80 wt %; or about 40 wt % to about 75 wt %; or about 40 wt % to about 70 wt %; or about 40 wt % to about 65 wt %; or about 40 wt % to about 60 wt %; or about 40 wt % to about 55 wt %; or about 40 wt % to about 50 wt %; or about 40 wt % to about 45 wt %; or about 45 wt % to about 99 wt %; or about 45 wt % to about 95 wt %; or about 45 wt % to about 90 wt %; or about 45 wt % to about 85 wt %; or about 45 wt % to about 80 wt %; or about 45 wt % to about 75 wt %; or about 45 wt % to about 70 wt %; or about 45 wt % to about 65 wt %; or about 45 wt % to about 60 wt %; or about 45 wt % to about 55 wt %; or about 45 wt % to about 50 wt %; or about 50 wt % to about 99 wt %; or about 50 wt % to about 95 wt %; or about 50 wt % to about 90 wt %; or about 50 wt % to about 85 wt %; or about 50 wt % to about 80 wt %; or about 50 wt % to about 75 wt %; or about 50 wt % to about 70 wt %; or about 50 wt % to about 65 wt % or about 50 wt % to about 60 wt %; or about 50 wt % to about 55 wt %; or about 55 wt % to about 99 wt %; or about 55 wt % to about 95 wt %; or about 55 wt % to about 90 wt %; or about 55 wt % to about 85 wt %; or about 55 wt % to about 80 wt %; or about 55 wt % to about 75 wt %; or about 55 wt % to about 70 wt %; or about 55 wt % to about 65 wt %; or about 55 wt % to about 60 wt %; or about 60 wt % to about 99 wt %; or about 60 wt % to about 95 wt %; or about 60 wt % to about 90 wt %; or about 60 wt % to about 85 wt %; or about 60 wt % to about 80 wt %; or about 60 wt % to about 75 wt %; or about 60 wt % to about 70 wt %; or about 60 wt % to about 65 wt %; or about 65 wt % to about 99 wt %; or about 65 wt % to about 95 wt %; or about 65 wt % to about 90 wt %; or about 65 wt % to about 85 wt %; or about 65 wt % to about 80 wt %; or about 65 wt % to about 75 wt %; or about 65 wt % to about 70 wt %; or about 70 wt % to about 99 wt %; or about 70 wt % to about 95 wt %; or about 70 wt % to about 90 wt %; or about 70 wt % to about 85 wt %; or about 70 wt % to about 80 wt %; or about 70 wt % to about 75 wt %; or about 75 wt % to about 99 wt %; or about 75 wt % to about 95 wt %; or about 75 wt % to about 90 wt %; or about 75 wt % to about 85 wt %; or about 75 wt % to about 80 wt %; or about 80 wt % to about 99 wt %; or about 80 wt % to about 95 wt %; or about 80 wt % to about 90 wt %; or about 80 wt % to about 85 wt %; or about 85 wt % to about 99 wt %; or about 85 wt % to about 95 wt %; or about 85 wt % to about 90 wt %; or about 90 wt % to about 99 wt %; or about 90 wt % to about 95 wt %; or about 95 wt % to about 99 wt %.

The polymer binders may be provided as dispersions or solutions. The dispersions or solutions may have a solids content of about 10 wt % to about 70 wt %. For example, the polymer dispersions or solutions may have a solids content of about 10 wt % to about 65 wt %; or about 10 wt % to about 60 wt %; or about 10 wt % to about 55 wt %; or about 10 wt % to about 50 wt %; or about 10 wt % to about 45 wt %; or about 10 wt % to about 40 wt %; or about 10 wt % to about 35 wt %; or about 10 wt % to about 30 wt %; or about 10 wt % to about 25 wt %; or about 10 wt % to about 20 wt %; or about 10 wt % to about 15 wt %; or about 15 wt % to about 70 wt %; or about 15 wt % to about 65 wt %; or about 15 wt % to about 60 wt %; or about 15 wt % to about 55 wt %; or about 15 wt % to about 50 wt %; or about 15 wt % to about 45 wt %; or about 15 wt % to about 40 wt %; or about 15 wt % to about 35 wt %; or about 15 wt % to about 30 wt %; or about 15 wt % to about 25 wt %; or about 15 wt % to about 20 wt %; or about 20 wt % to about 70 wt %; or about 20 wt % to about 65 wt %; or about 20 wt % to about 60 wt %; or about 20 wt % to about 55 wt %; or about 20 wt % to about 50 wt %; or about 20 wt % to about 45 wt %; or about 20 wt % to about 40 wt %; or about 20 wt % to about 35 wt %; or about 20 wt % to about 30 wt %; or about 20 wt % to about 25 wt %; or about 25 wt % to about 70 wt %; or about 25 wt % to about 65 wt %; or about 25 wt % to about 60 wt %; or about 25 wt % to about 55 wt %; or about 25 wt % to about 50 wt %; or about 25 wt % to about 45 wt %; or about 25 wt % to about 40 wt %; or about 25 wt % to about 35 wt %; or about 25 wt % to about 30 wt %; or about 30 wt % to about 70 wt %; or about 30 wt % to about 65 wt %; or about 30 wt % to about 60 wt %; or about 30 wt % to about 55 wt %; or about 30 wt % to about 50 wt %; or about 30 wt % to about 45 wt %; or about 30 wt % to about 40 wt %; or about 30 wt % to about 35 wt %; or about 35 wt % to about 70 wt %; or about 35 wt % to about 65 wt %; or about 35 wt % to about 60 wt %; or about 35 wt % to about 55 wt %; or about 35 wt % to about 50 wt %; or about 35 wt % to about 45 wt %; or about 35 wt % to about 40 wt %; or about 40 wt % to about 70 wt %; or about 40 wt % to about 65 wt %; or about 40 wt % to about 60 wt %; or about 40 wt % to about 55 wt %; or about 40 wt % to about 50 wt %; or about 40 wt % to about 45 wt %; or about 45 wt % to about 70 wt %; or about 45 wt % to about 65 wt %; or about 45 wt % to about 60 wt %; or about 45 wt % to about 55 wt %; or about 45 wt % to about 50 wt %; or about 50 wt % to about 70 wt %; or about 50 wt % to about 65 wt %; or about 50 wt % to about 60 wt %; or about 50 wt % to about 55 wt %; or about 55 wt % to about 70 wt %; or about 55 wt % to about 65 wt %; or about 55 wt % to about 60 wt %; or about 60 wt % to about 70 wt %; or about 60 wt % to about 65 wt %; or about 65 wt % to about 70 wt %.

In some embodiments, the solids content of the acrylic-based polymer dispersion is about 30 wt % to about 70 wt %. Preferably, the solids content of the acrylic-based polymer dispersion or solution is about 35 wt % to about 65 wt %, and more preferably about 40 wt % to about 60 wt %.

In some embodiments, the polymer binder of the present invention includes a polymer solution containing one or more acrylic-based polymers with a solids content of about 10 wt % to about 60 wt %, preferably about 20 wt % to about 50 wt %, and more preferably about 30 wt % to about 40 wt %.

In some embodiments, the viscosity of the acrylic-based polymer dispersion is about 10 cP to about 3,000 cP, preferably about 100 cP to about 2,500 cP, and more preferably about 200 cP to about 2,000 cP.

In some embodiments, the viscosity of the acrylic-based polymer solution is about 100 cP to about 50,000 cP, preferably about 500 cP to about 10,000 cP, and more preferably about 1,000 cP to about 5,000 cP.

In some embodiments, the acrylic-based polymer in the dispersion has one or more phases with at least one glass transition temperature (Tg) in the range of about −50° C. to about 50° C. Preferably the acrylic-based polymer has one or more phases with at least one Tg in the range of about −40° C. to about 30° C., and more preferably in the range of about −30° C. to about 10° C. For example, the acrylic-based polymer in the dispersion may have at least one Tg in the range of about −50° C. to about 40° C.; or about −50° C. to about 30° C.; or about −50° C. to about 20° C.; or about −50° C. to about 10° C.; or about −50° C. to about 0° C.; or about −40° C. to about 50° C.; or about −40° C. to about 40° C.; or about −40° C. to about 30° C.; or about −40° C. to about 20° C.; or about −40° C. to about 10° C.; or about −40° C. to about 0° C.; or about −30° C. to about 50° C.; or about −30° C. to about 40° C.; or about −30° C. to about 30° C.; or about −30° C. to about 20° C.; or about −30° C. to about 10° C.; or about −30° C. to about 0° C.; or about −20° C. to about 50° C.; or about −20° C. to about 40° C.; or about −20° C. to about 30° C.; or about −20° C. to about 20° C.; or about −20° C. to about 10° C.; or about −20° C. to about 0° C.; or about −10° C. to about 50° C.; or about −10° C. to about 40° C.; or about −10° C. to about 30° C.; or about −10° C. to about 20° C.; or about −10° C. to about 10° C.; or about −10° C. to about 0° C.

In some embodiments, the Tg of the acrylic-based polymer in the solution has one or more phases with a Tg of about 0° C. to about 200° C. Preferably, the dispersion contains an acrylic-based polymer with a Tg of about 25° C. to about 150° C., and more preferably about 50° C. to about 100° C. For example, the acrylic-based polymer in the dispersion may have a Tg of about 0° C. to about 190° C.; or about 0° C. to about 180° C.; or about 0° C. to about 170° C.; or about 0° C. to about 160° C.; or about 0° C. to about 150° C.; or about 0° C. to about 140° C.; or about 0° C. to about 130° C.; or about 0° C. to about 120° C.; or about 0° C. to about 110° C.; or about 0° C. to about 90° C.; or about 0° C. to about 80° C.; or about 0° C. to about 70° C.; about 0° C. to about 60° C.; or about 0° C. to about 50° C.; or about 0° C. to about 40° C.; or about 0° C. to about 30° C.; or about 0° C. to about 10° C.; or about 0° C. to about 20° C.; or about 10° C. to about 200° C.; or about 10° C. to about 190° C.; or about 10° C. to about 180° C.; or about 10° C. to about 170° C.; or about 10° C. to about 160° C.; or about 10° C. to about 150° C.; or about 10° C. to about 140° C.; or about 10° C. to about 130° C.; or about 10° C. to about 120° C.; or about 10° C. to about 110° C.; or about 10° C. to about 90° C.; or about 10° C. to about 80° C.; or about 10° C. to about 70° C.; or about 10° C. to about 60° C.; or about 10° C. to about 50° C.; or about 10° C. to about 40° C.; or about 10° C. to about 30° C.; or about 10° C. to about 20° C.; or about 20° C. to about 200° C.; or about 20C to about 190C; or about 20C to about 180C; or about 20C to about 170 C; or about 20° C. to about 160° C.; or about 20° C. to about 150° C.; or about 20° C. to about 140° C.; or about 20° C. to about 130° C.; or about 20° C. to about 120° C.; or about 20° C. to about 110° C.; or about 20° C. to about 100° C.; or about 20° C. to about 90° C.; or about 20° C. to about 80° C.; or about 20° C. to about 70° C.; or about 20° C. to about 60° C.; or about 20° C. to about 50° C.; or about 20° C. to about 40° C.; or about 20° C. to about 30° C.; or about 30° C. to about 200° C.; or about 30° C. to about 190° C.; or about 30° C. to about 180° C.; or about 30° C. to about 170° C.; or about 30° C. to about 160° C.; or about 30° C. to about 150° C.; or about 30° C. to about 140° C.; or about 30° C. to about 130° C.; or about 30° C. to about 120° C.; or about 30° C. to about 110° C.; or about 30° C. to about 100° C.; or about 30° C. to about 90° C.; or about 30° C. to about 80° C.; or about 30° C. to about 70° C.; or about 30° C. to about 60° C.; or about 30° C. to about 50° C.; or about 30° C. to about 40° C.; or about 40° C. to about 200° C.; or about 40° C. to about 190° C.; or about 40° C. to about 180° C.; or about 40° C. to about 170° C.; or about 40° C. to about 160° C.; or about 40° C. to about 150° C.; or about 40° C. to about 140° C.; or about 40° C. to about 130° C.; or about 40° C. to about 120° C.; or about 40° C. to about 110° C.; or about 40° C. to about 100° C.; or about 40° C. to about 90° C.; or about 40° C. to about 80° C.; or about 40° C. to about 70° C.; or about 40° C. to about 60° C.; or about 40° C. to about 50° C.; or about 50° C. to about 200° C.; or about 50° C. to about 190° C.; or about 50° C. to about 180° C.; or about 50° C. to about 170° C.; or about 50° to about 160° C.; or about 50° C. to about 150° C.; or about 50° C. to about 140° C.; or about 50° C. to about 130° C.; or about 50° C. to about 120° C.; or about 50° C. to about 110° C.; or about 50° C. to about 100° C.; or about 50° C. to about 90° C.; or about 50° C. to about 80° C.; or about 50° C. to about 70° C.; or about 50° C. to about 60° C.; or about 60° C. to about 200° C.; or about 60° C. to about 190° C.; or about 60° C. to about 180° C.; or about 60° C. to about 170° C.; or about 60° C. to about 160° C.; or about 60° C. to about 150° C.; or about 60° C. to about 140° C.; or about 60° C. to about 130° C.; or about 60° C. to about 120° C.; or about 60° C. to about 110° C.; or about 60° C. to about 100° C.; or about 60° C. to about 90° C.; or about 60° C. to about 80° C.; or about 60° C. to about 70° C.; or about 70° C. to about 200° C.; or about 70° C. to about 190° C.; or about 70° C. to about 180° C.; or about 70° C. to about 170° C.; or about 70° C. to about 160° C.; or about 70° C. to about 150° C.; or about 70° C. to about 140° C.; or about 70° C. to about 130° C.; or about 70° C. to about 120° C.; or about 70° C. to about 110° C.; or about 70° C. to about 100° C.; or about 70° C. to about 90° C.; or about 70° C. to about 80° C.; or about 80° C. to about 200° C.; or about 80° C. to about 190° C.; or about 80°

C. to about 180° C.; or about 80° C. to about 170° C.; or about 80° C. to about 160° C.; or about 80° C. to about 150° C.; or about 80° C. to about 140° C.; or about 80° C. to about 130° C.; or about 80° C. to about 120° C.; or about 80° C. to about 110° C.; or about 80° C. to about 100° C.; or about 80° C. to about 90° C.; or about 90° C. to about 200° C.; or about 90° C. to about 190° C.; or about 90° C. to about 180° C.; or about 90° C. to about 170° C.; or about 90° C. to about 160° C.; or about 90° C. to about 150° C.; or about 90° C. to about 140° C.; or about 90° C. to about 130° C.; or about 90° C. to about 120° C.; or about 90° C. to about 110° C.; or about 90° C. to about 100° C.; or about 100° C. to about 200° C.; or about 100° C. to about 190° C.; or about 100° C. to about 180° C.; or about 100° C. to about 170° C.; or about 100° C. to about 160° C.; or about 100° C. to about 150° C.; or about 100° C. to about 140° C.; or about 100° C. to about 130° C.; or about 100° C. to about 120° C.; or about 100° C. to about 110° C.; or about 110° C. to about 200° C.; or about 110° C. to about 190° C.; or about 110° C. to about 180° C.; or about 110° C. to about 170° C.; or about 110° C. to about 160° C.; or about 110° C. to about 150° C.; or about 110° C. to about 140° C.; or about 110° C. to about 130° C.; or about 110° C. to about 120° C.; or about 120° C. to about 200° C.; or about 120° C. to about 190° C.; or about 120° C. to about 180° C.; or about 120° C. to about 170° C.; or about 120° C. to about 160° C.; or about 120° C. to about 150° C.; or about 120° C. to about 140° C.; or about 120° C. to about 130° C.; or about 130° C. to about 200° C.; or about 130° C. to about 190° C.; or about 130° C. to about 180° C.; or about 130° C. to about 170° C.; or about 130° C. to about 160° C.; or about 130° C. to about 150° C.; or about 130° C. to about 140° C.; or about 140° C. to about 200° C.; or about 140° C. to about 190° C.; or about 140° C. to about 180° C.; or about 140° C. to about 170° C.; or about 140° C. to about 160° C.; or about 140° C. to about 150° C.; or about 150° C. to about 200° C.; or about 150° C. to about 190° C.; or about 150° C. to about 180° C.; or about 150° C. to about 170° C.; or about 150° C. to about 160° C.; or about 160° C. to about 200° C.; or about 160° C. to about 190° C.; or about 160° C. to about 180° C.; or about 160° C. to about 170° C.; or about 170° C. to about 200° C.; or about 170° C. to about 190° C.; or about 170° C. to about 180° C.; or about 180° C. to about 200° C.; or about 180° C. to about 190° C.; or about 190° C. to about 200° C.

In some embodiments, the acid value of the acrylic-based polymer in the dispersion is about 10 mg KOH/g to about 150 mg KOH/g. Preferably, the acid value of the acrylic-based polymer in the dispersion is 30 mg KOH/g to about 120 mg KOH/g, and more preferably about 50 mg KOH/g to about 100 mg KOH/g. For example, the acid value, in mg KOH/g, of the acrylic based polymer may be about 10 to about 140; or about 10 to about 130; or about 10 to about 120; or about 10 to about 110; or about 10 to about 100; or about 10 to about 90; or about 10 to about 80; or about 10 to about 70; or about 10 to about 60; or about 10 to about 50; or about 10 to about 40; or about 10 to about 30; or about 10 to about 20; or about 20 to about 150; or about 20 to about 140; or about 20 to about 130; or about 20 to about 120; or about 20 to about 110; or about 20 to about 100; or about 20 to about 90; or about 20 to about 80; or about 20 to about 70; or about 20 to about 60; or about 20 to about 50; or about 20 to about 40; or about 20 to about 30; or about 30 to about 150; or about 30 to about 140; or about 30 to about 130; or about 30 to about 120; or about 30 to about 110; or about 30 to about 100; or about 30 to about 90; or about 30 to about 80; or about 30 to about 70; or about 30 to about 60; or about 30 to about 50; or about 30 to about 40; or about 40 to about 150; or about 40 to about 140; or about 40 to about 130; or about 40 to about 120; or about 40 to about 110; or about 40 to about 100; or about 40 to about 90; or about 40 to about 80; or about 40 to about 70; or about 40 to about 60; or about 40 to about 50; or about 50 to about 150; or about 50 to about 140; or about 50 to about 130; or about 50 to about 120; or about 50 to about 110; or about 50 to about 100; or about 50 to about 90; or about 50 to about 80; or about 50 to about 70; or about 50 to about 60; or about 60 to about 150; or about 60 to about 140; or about 60 to about 130; or about 60 to about 120; or about 60 to about 110; or about 60 to about 100; or about 60 to about 90; or about 60 to about 80; or about 60 to about 70; or about 70 to about 150; or about 70 to about 140; or about 70 to about 130; or about 70 to about 120; or about 70 to about 110; or about 70 to about 100; or about 70 to about 90; or about 70 to about 80; or about 80 to about 150; or about 80 to about 140; or about 80 to about 130; or about 80 to about 120; or about 80 to about 110; or about 80 to about 100; or about 80 to about 90; or about 90 to about 150; or about 90 to about 140; or about 90 to about 130; or about 90 to about 120; or about 90 to about 110; or about 90 to about 100; or about 100 to about 150; or about 100 to about 140; or about 100 to about 130; or about 100 to about 120; or about 100 to about 110; or about 110 to about 150; or about 110 to about 140; or about 110 to about 130; or about 110 to about 120; or about 120 to about 150; or about 120 to about 140; or about 120 to about 130; or about 130 to about 150; or about 130 to about 140; or about 140 to about 150.

In some embodiments, the acid value of the acrylic-based polymer in the solution is about 50 mg KOH/g to about 500 mg KOH/g, preferably about 100 mg KOH/g to about 400 mg KOH/g, and more preferably about 150 mg KOH/g to about 300 mg KOH/g. For example, the acid value of the acrylic-based polymer can be, in mg KOH/g, about 50 to about 450; or about 50 to about 400; or about 50 to about 350; or about 50 to about 300; or about 50 to about 250; or about 50 to about 200; or about 60 to about 500; or about 60 to about 450; or about 60 to about 400; or about 60 to about 350; or about 60 to about 300; or about 60 to about 250; or about 60 to about 200; or about 70 to about 500; or about 70 to about 450; or about 70 to about 400; or about 70 to about 350; or about 70 to about 300; or about 70 to about 250; or about 70 to about 200; or about 80 to about 500; or about 80 to about 450; or about 80 to about 400; or about 80 to about 350; or about 80 to about 300; or about 80 to about 250; or about 80 to about 200; or about 70 to about 500; or about 90 to about 450; or about 90 to about 400; or about 90 to about 350; or about 90 to about 300; or about 90 to about 250; or about 90 to about 200; or about 100 to about 500; or about 100 to about 450; or about 100 to about 400; or about 100 to about 350; or about 100 to about 300; or about 100 to about 250; or about 100 to about 200; or about 110 to about 500; or about 110 to about 450; or about 110 to about 400; or about 110 to about 350; or about 110 to about 300; or about 110 to about 250; or about 110 to about 200; or about 120 to about 500; or about 120 to about 450; or about 120 to about 400; or about 120 to about 350; or about 120 to about 300; or about 120 to about 250; or about 120 to about 200; or about 130 to about 150; or about 130 to about 500; or about 130 to about 450; or about 130 to about 400; or about 130 to about 350; or about 130 to about 300; or about 130 to about 250; or about 130 to about 200; or about 140 to about 500; or about 140 to about 450; or about 140 to about 400; or about 140 to about 350; or about 140 to about 300; or about 140 to about 250; or about 140 to about 200;

or about 150 to about 500; or about 150 to about 450; or about 150 to about 400; or about 150 to about 350; or about 150 to about 300; or about 150 to about 250; or about 150 to about 200; or about 160 to about 500; or about 160 to about 450; or about 160 to about 400; or about 160 to about 350; or about 160 to about 300; or about 160 to about 250; or about 160 to about 200; or about 170 to about 500; or about 170 to about 450; or about 170 to about 400; or about 170 to about 350; or about 170 to about 300; or about 170 to about 250; or about 1790 to about 200; or about 180 to about 500; or about 180 to about 450; or about 180 to about 400; or about 180 to about 350; or about 180 to about 300; or about 180 to about 250; or about 180 to about 200; or about 190 to about 500; or about 190 to about 450; or about 190 to about 400; or about 190 to about 350; or about 190 to about 300; or about 190 to about 250; or about 190 to about 200; or about 200 to about 500; or about 200 to about 450; or about 200 to about 400; or about 200 to about 350; or about 200 to about 300; or about 200 to about 250; or about 250 to about 500; or about 250 to about 450; or about 250 to about 400; or about 250 to about 350; or about 250 to about 300; or about 300 to about 500; or about 300 to about 450; or about 300 to about 400; or about 300 to about 350; or about 350 to about 500; or about 350 to about 450; or about 350 to about 400; or about 400 to about 500; or about 400 to about 450; or about 450 to about 500.

There are a number of commercially available acrylic-based polymer dispersion products suitable for inclusion in the coating compositions described herein. For food contact applications, products include, for example, Joncryl® DFC 3030, available from BASF, NeoCryl A-2092, available from DSM, and Texicryl 13-525, available from Scott Bader. For non-food contact applications, products include, for example, Texicryl 13-814, available from Scott Bader Neocryl A-1095, available from DSM, and Induprint SE 245, available from Indulor.

There are a number of commercially available acrylic-based polymer solution products suitable for inclusion in the printing inks and coating compositions described herein. For food contact applications, products include, for example, Joncryl® DFC 3025 and Joncryl® ECO 75, both available from BASF. For non-food contact applications, products include, for example, Joncryl® 60 (BASF), Texicryl S-0245 (Scott Bader), and Induprint S 1033 (Indulor).

In some embodiments, the polymer binder of the present invention includes a polymer dispersion containing one or more styrene-butadiene copolymers. The styrene-butadiene copolymer can be derived from monomers including styrene, butadiene, (meth)acrylic acid, itaconic acid, (meth)acrylamide, (meth)acrylonitrile, and mixtures thereof. The styrene-butadiene copolymer can also include one or more crosslinking monomers, such as divinylbenzene. One or more crosslinking monomers can be present in an amount of from about 0% to about 3%, on a solids weight basis; or about 0.1% to about 3%; or about 0.1% to about 2.5%; or about 0.1% to about 2%; or about 0.1% to about 1.5%; or about 0.1% to about 1%; or about 0.1% to about 0.5%; or about 0.5% to about 3%; or about 0.5% to about 2.5%; or about 0.5% to about 2%; or about 0.5% to about 1.5%; or about 0.5% to about 1%; or about 1% to about 3%; or about 1% to about 2.5%; or about 1% to about 2%; or about 1% to about 1.5%; or about 1.5% to about 3%; or about 1.5% to about 2.5%; or about 1.5% to about 2%; or about 2% to about 3%; or about 2% to about 2.5%; or about 2.5% to about 3%.

In some embodiments, the styrene-butadiene copolymer dispersion has a solids content of about 30 wt % to about 70 wt %, preferably about 35 wt % to about 65 wt %, and more preferably about 40 wt % to about 60 wt %. For example, the styrene-butadiene copolymer dispersion may have a solids content of about 30 wt % to about 70 wt %; or about 30 wt % to about 65 wt %; or about 30 wt % to about 55 wt %; or about 30 wt % to about 50 wt %; or about 30 wt % to about 45 wt %; or about 30 wt % to about 40 wt %; or about 30 wt % to about 35 wt %; or about 35 wt % to about 70 wt %; or about 35 wt % to about 65 wt %; or about 35 wt % to about 60 wt %; or about 35 wt % to about 55 wt %; or about 35 wt % to about 50 wt %; or about 35 wt % to about 45 wt %; or about 35 wt % to about 40 wt %; or about 40 wt % to about 70 wt %; or about 40 wt % to about 65 wt %; or about 40 wt % to about 60 wt %; or about 40 wt % to about 55 wt %; or about 40 wt % to about 50 wt %; or about 40 wt % to about 45 wt %; or about 45 wt % to about 70 wt %; or about 45 wt % to about 65 wt %; or about 45 wt % to about 60 wt %; or about 45 wt % to about 55 wt %; or about 45 wt % to about 50 wt %; or about 50 wt % to about 70 wt %; or about 50 wt % to about 65 wt %; or about 50 wt % to about 60 wt %; or about 50 wt % to about 55 wt %; or about 55 wt % to about 70 wt %; or about 55 wt % to about 65 wt %; or about 55 wt % to about 60 wt %; or about 60 wt % to about 70 wt %; or about 60 wt % to about 65 wt %; or about 65 wt % to about 70 wt %.

In some embodiments, the viscosity of the styrene-butadiene copolymer dispersion is about 10 cP to about 2,000 cP. Preferably, the viscosity of the styrene-butadiene copolymer dispersion is about 50 cP to about 1,500 cP, and more preferably about 100 cP to about 1,000 cP. For example, the viscosity of the styrene-butadiene copolymer dispersion may be about 10 cP to about 1,500 cP; or about 10 cP to about 1,000 cP; or about 10 cP to about 500 cP; or about 10 cP to about 100 cP; or about 10 cP to about 50 cP; or about 50 cP to about 2,000 cP; or about 50 cP to about 1,500 cP; or about 50 cP to about 1,000 cP; or about 50 cP to about 500 cP; or about 50 cP to about 100 cP; or about 100 cP to about 2,000 cP; or about 100 cP to about 1,500 cP; or about 100 cP to about 1,000 cP; or about 100 cP to about 500 cP; or about 500 cP to about 2,000 cP; or about 500 cP to about 1,500 cP; or about 500 cP to about 1,000 cP; or about 1,000 cP to about 2,000 cP; or about 1,000 cP to about 1,500 cP; or about 1,500 cP to about 2,000 cP.

In some embodiments, the glass transition temperature (Tg) of the styrene-butadiene copolymer in the dispersion is in the range of about −30° C. to about 30° C., preferably about −20° C. to about 20° C., and more preferably in the range of about −10° C. to about 10° C. For example, the Tg of the styrene-butadiene copolymer in the dispersion may be about −30° C. to about 25° C.; or about −30° C. to about 20° C.; or about −30° C. to about 15° C.; or about −30° C. to about 10° C.; or about −30° C. to about 5° C.; or about −30° C. to about 0° C.; or about −30° C. to about −5° C.; or about −30° C. to about −10° C.; or about −30° C. to about −15° C.; or about −30° C. to about −20° C.; or bout −30° C. to about −25° C.; or about −25° C. to about 30° C.; or about −25° C. to about 25° C.; or about −25° C. to about 20° C.; or about −25° C. to about 15° C.; or about −25° C. to about 10° C.; or about −25° C. to about 5° C.; or about −25° C. to about 0° C.; or about −25° C. to about −5° C.; or about −25° C. to about −10° C.; or about −25° C. to about −15° C.; or about −25° C. to about −20° C.; or about −20° C. to about 30° C.; or about −20° C. to about 25° C.; or about −20° C. to about 20° C.; or about −20° C. to about 15° C.; or about −20° C. to about 10° C.; or about −20° C. to about 10° C.; or about −20° C. to about 5° C.; or about −20° C. to about 0° C.; or about −20° C. to about −5° C.; or about −20° C. to about −10° C.; or about −20° C. to about −15° C.; or about −15° C. to about 30° C.; or about −15° C. to about 25° C.; or about −15° C. to about 20° C.; or about −15° C. to about 15° C.; or about −15° C. to about 10° C.; or about −15° C. to about 5° C.; or about −15° C. to about 0° C.; or about −15° C. to about −5° C.; or about −15° C. to about −10° C.; or about −10° C. to about 30° C.; or about −10° C. to about 25° C.; or about −10° C. to about 20° C.; or about −10° C. to about 15° C.; or about −10° C. to about 10° C.; or about −10° C. to about 5° C.; or about −10° C. to about 0° C.; or about −10° C. to about −5° C.; or about −5° C. to about 30° C.; or about −5° C. to about 25° C.; or about −5° C. to about 20° C.; or about −5° C. to about 15° C.; or about −5° C. to about 10° C.; or about −5° C. to about 5° C.; or about −5° C. to about 0° C.; or about 0° C. to about 30° C.; or about 0° C. to about 25° C.; or about 0° C. to about 20° C.; or about 0° C. to about 15° C.; or about 0° C. to about 10° C.; or about 0° C. to about 5° C.; or about 5° C. to about 30° C.; or about 5° C. to about 25° C.; or about 5° C. to about 20° C.; or about 5° C. to about 15° C.; or about 5° C. to about 10° C.; or about 10° C. to about 30° C.; or about 10° C. to about 25° C.; or about 10° C. to about 20° C.; or about 10° C. to about 15° C.; or about 15° C. to about 30° C.; or about 15° C. to about 25° C.; or about 15° C. to about 20° C.; or about 20° C. to about 30° C.; or about 20° C. to about 25° C.; or about 25° C. to about 30° C.

In some embodiments, the acid value of the styrene-butadiene copolymer in the dispersion is about 0 mg KOH/g to about 100 mg KOH/g, preferably about 5 mg KOH/g to about 50 mg KOH/g, and more preferably about 10 mg KOH/g to about 30 mg KOH/g. For example, the acid value of the styrene-butadiene copolymer in the dispersion may be, in mg KOH/g, about 0 to about 95; or about 0 to about 90; or about 0 to about 85; or about 0 to about 80; or about 0 to about 75; or about 0 to about 70; or about 0 to about 65; or about 0 to about 60; or about 0 to about 55; or about 0 to about 50; or about 0 to about 45; or about 0 to about 40; or about 0 to about 35; or about 0 to about 30; or about 0 to about 25; or about 0 to about 20; or about 0 to about 15; or about 0 to about 10; or about 0 to about 5; or about 5 to about 100; or about 5 to about 95; or about 5 to about 90; or about 5 to about 85; or about 5 to about 80; or about 5 to about 75; or about 5 to about 70; or about 5 to about 65; or about 5 to about 60; or about 5 to about 55; or about 5 to about 50; or about 5 to about 45; or about 5 to about 45; or about 5 to about 40; or about 5 to about 35; or about 5 to about 30; or about 5 to about 25; or about 5 to about 20; or about 5 to about 15; or about 5 to about 10; or about 10 to about 100; or about 10 to about 95; or about 10 to about 90; or about 10 to about 85; or about 10 to about 80; or about 10 to about 75; or about 10 to about 70; or about 10 to about 65; or about 10 to about 60; or about 10 to about 55; or about 10 to about 50; or about 10 to about 45; or about 10 to about 40; or about 10 to about 35; or about 10 to about 30; or about 10 to about 25; or about 10 to about 20; or about 10 to about 15; or about 15 to about 100; or about 15 to about 95; or about 15 to about 90; or about 15 to about 85; or about 15 to about 80; or about 15 to about 75; or about 15 to about 70; or about 15 to about 65; or about 15 to about 60; or about 15 to about 55; or about 15 to about 50; or about 15 to about 45; or about 15 to about 40; or about 15 to about 35; or about 15 to about 30; or about 15 to about 25; or about 15 to about 20; or about 20 to about 100; or about 20 to about 95; or about 20 to about 90; or about 20 to about 85; or about 20 to about 80; or about 20 to about 75; or about 20 to about 70; or about 20 to about 65; or about 20 to about 60; or about 20 to about 55; or about 20 to about 50; or about 20 to about 45; or about 20 to about 40; or about 20 to about 35; or about 20 to about 30; or about 20 to about 25; or about 25 to about 100; or about 25 to about 95; or about 25 to about 90; or about 25 to about 85; or about 25 to about 80; or about 25 to about 75; or about 25 to about 70; or about 25 to about 65; or about 25 to about 60; or about 25 to about 55; or about 25 to about 50; or about 25 to about 45; or about 25 to about 40; or about 25 to about 35; or about 25 to about 30; or about 30 to about 100; or about 30 to about 95; or about 30 to about 90; or about 30 to about 85; or about 30 to about 80; or about 30 to about 75; or about 30 to about 70; or about 30 to about 65; or about 30 to about 60; or about 30 to about 55; or about 30 to about 50; or about 30 to about 45; or about 30 to about 40; or about 30 to about 35; or about 35 to about 100; or about 35 to about 95; or about 35 to about 90; or about 35 to about 85; or about 35 to about 80; or about 35 to about 75; or about 35 to about 70; or about 35 to about 65; or about 35 to about 60; or about 35 to about 55; or about 35 to about 50; or about 35 to about 45; or about 35 to about 40; or about 40 to about 100; or about 40 to about 95; or about 40 to about 90; or about 40 to about 85; or about 40 to about 80; or about 40 to about 75; or about 40 to about 70; or about 40 to about 65; or about 40 to about 60; or about 40 to about 55; or about 40 to about 50; or about 40 to about 45; or about 45 to about 100; or about 45 to about 95; or about 45 to about 90; or about 45 to about 85; or about 45 to about 80; or about 45 to about 75; or about 45 to about 70; or about 45 to about 65; or about 45 to about 60; or about 45 to about 55; or about 45 to about 50; or about 50 to about 100; or about 50 to about 95; or about 50 to about 90; or about 50 to about 85; or about 50 to about 80; or about 50 to about 75; or about 50 to about 70; or about 50 to about 65; or about 60 to about 60; or about 50 to about 55; or about 55 to about 100; or about 55 to about 95; or about 55 to about 90; or about 55 to about 85; or about 55 to about 80; or about 55 to about 75; or about 55 to about 70; or about 55 to about 65; or about 55 to about 60; or about 60 to about 100; or about 60 to about 95; or about 60 to about 90; or about 60 to about 85; or about 60 to about 80; or about 60 to about 75; or about 60 to about 70; or about 60 to about 65; or about 65 to about 100; or about 65 to about 95; or about 65 to about 90; or about 65 to about 85; or about 65 to about 80; or about 65 to about 75; or about 65 to about 70; or about 70 to about 100; or about 70 to about 95; or about 70 to about 90; or about 70 to about 85; or about 70 to about 80; or about 70 to about 75; or about 75 to about 100; or about 75 to about 95; or about 75 to about 90; or about 75 to about 85; or about 75 to about 80; or about 80 to about 100; or about 80 to about 95; or about 80 to about 90; or about 80 to about 85; or about 85 to about 100; or about 85 to about 95; or about 35 to about 90; or about 90 to about 100; or about 90 to about 95; or about 95 to about 100.

There are a number of commercially available styrene-butadiene copolymer dispersion products suitable for inclusion in the coating compositions described herein. For food contact applications, products include, for example, Genflo 3003, available from Omnova Solutions, Rovene 4019, available from Mallard Creek, and Savinex 98F10, available from Synthetic Latex Company. For non-food contact applications, products include, for example, Rovene 4009, available from Mallard Creek, and ENCOR DL 313 4009, available from Arkema.

In some embodiments, the polymer binders comprise at least one polymer with a heat seal onset temperature of less than 200° C. For example, at least one polymer may have a heat seal onset temperature of less than 170° C., or less than 150° C. Preferably, at least one polymer has a heat seal onset temperature less than 120° C. For example, the polymer binders may comprise at least one polymer with a heat seal onset temperature of about 0° C. to about 200° C.; or about 0° C. to about 190° C.; or about 0° C. to about 180° C.; or about 0° C. to about 170° C.; or about 0° C. to about 160° C.; or about 0° C. to about 150° C.; or about 0° C. to about 140° C.; or about 0° C. to about 130° C.; or about 0° C. to about 120° C.; or about 0° C. to about 110° C.; or about 0° C. to about 100° C.; or about 0° C. to about 90° C.; or about 0° C. to about 80° C.; or about 0° C. to about 70° C.; or about 0° C. to about 60° C.; or about 0° C. to about 50° C.; or about 0° C. to about 40° C.; or about 0° C. to about 30° C.; or about 0° C. to about 20° C.; or about 0° C. to about 10° C. However, it is to be understood that the heat seal temperature can be any temperature below about 200° C.

In some embodiments, the compositions of the present invention contain particles. The particles include, but are not limited to, fillers such as talc or calcium carbonate, and organic waxes such as high density polyethylene (HDPE) or N,N'-ethylene-bis-stearamide. The shapes of the particles include, but are not limited to, lamellar and spherical.

Any known and conventional filler material may be included in the coatings described herein. Suitable fillers include, but are not limited to, talc, clay, alumina, silica, titanium dioxide, sodium hexametaphosphate, calcium carbonate and mixtures thereof. Other materials may be used. In one aspect, the amount of filler materials present, on a solid weight basis, is about 0 wt % to about 30 wt %. Preferably, the filler material is talc or calcium carbonate. The talc is usually delaminated high aspect ratio talc, and the calcium carbonate can be either ground or synthetically precipitated.

As used herein, "talc" is understood to mean the hydrated magnesium silicate mineral, or the mineral chlorite (hydrated magnesium aluminum silicate), or a mixture of the two, optionally associated with other minerals (e.g. dolomite). Talc also includes mineral substances derived from talc and having similar properties.

The talc can have a particle size distribution such that the median diameter of the particles $S\text{-}D_{50}$ lies substantially between 0.5 μm and 5 μm, and the cutoff diameter $S\text{-}D_{95}$ is less than 25 μm, when measured by the SediGraph method (ISO 13317-3). The median diameter of the particles $L\text{-}D_{50}$ is generally between 5 μm and 15 μm, and the cutoff diameter $L\text{-}D_{95}$ is less than 50 μm, when measured by the laser diffraction method (ISO 13320-1). The talc can also have a lamellarity index greater than 2.0, preferably greater than 2.8, and more preferably greater than 4.

The "lamellarity index" characterizes the shape of the particle, and more particularly its flatness (large dimension/thickness ratio). In the present invention, the lamellarity index is calculated using the difference between the median diameter $D_{50}$ of the particles measured by the SediGraph method ($S\text{-}D_{50}$), and the value of the median diameter $D_{50}$ of the particles measured by the laser diffraction method ($L\text{-}D_{50}$), according to the equation below. Reference may be made to the article "G. BAUDET; J. P. RONA, IND. MIN. MINES ET CARR. LES TECHN., June 1990 (1990 Jun. 1), pages 55-61", which shows that this index is correlated to the mean ratio of the largest dimension of the particle to its smallest dimension (i.e. aspect ratio).

$$\text{Lamellarity Index} = \frac{L\text{-}D_{50}\ (\text{Laser}) - S\text{-}D_{50}\ (\text{SediGraph})}{S\text{-}D_{50}\ (\text{SediGraph})}$$

"High lamellarity" is understood to mean a particle having a lamellarity index greater than 2.0, preferably greater than 2.8, and more preferably greater than 4.

In some embodiments, the specific surface area (BET analysis method) of the talc is about 10 m²/g to about 30 m²/g, and preferably about 15 m²/g to about 25 m²/g. For example, the BET specific surface area of the talc may be about 10 m²/g to about 30 m²/g; or about 10 m²/g to about 25 m²/g; or about 10 m²/g to about 20 m²/g; or about 10 m²/g to about 15 m²/g; or about 15 m²/g to about 30 m²/g; or about 15 m²/g to about 25 m²/g; or about 15 m²/g to about 20 m²/g; or about 20 m²/g to about 30 m²/g; or about 20 m²/g to about 25 m²/g; or about 25 m²/g to about 30 m²/g.

One way of making these talc particles is described in U.S. Pat. No. 6,348,536. The use of the products for packaging materials described therein is incorporated into the present invention.

Commercially available talc products suitable for the use in the present invention include, but are not limited to, delaminated, high aspect ratio talcs, such as HAR® T77 and Luzenac HAR® T84, available from Imerys.

In some embodiments, waxes can be included in the coating compositions of the present invention, as a powder or an aqueous dispersion thereof. Suitable waxes include, but are not limited to, polyethylene, polypropylene, paraffin, amide, carnauba waxes, and mixtures thereof. In certain embodiments, the amount of waxes included in the compositions may be, on a solid weight basis, about 0 wt % to about 15 wt %. Higher amounts may compromise the recyclability and repulpability of the substrate.

Commercially available wax products suitable for inclusion in the coating compositions described herein include, but are not limited to, polyolefin waxes, such as high molecular weight polyethylene wax (e.g. Hydrocer 357 from Shamrock) and N,N'-ethylene bis-stearamide (e.g. Acrawax C from Lonza).

In some embodiments, the particles have a mean particle size greater than 4 μm, preferably over 8 μm. For example, the particles may have a mean particle size of about 4 μm to about 100 μm; or about 4 μm to about 90 μm; or about 4 μm to about 80 μm; or about 4 μm to about 70 μm; or about 4 μm to about 60 μm; or about 4 μm to about 50 μm; or about 4 μm to about 40 μm; or about 4 μm to about 30 μm; or about 4 μm to about 20 μm; or about 4 μm to about 15 μm; or about 4 μm to about 12 μm; or about 4 μm to about 10 μm; or about 4 μm to about 8 μm; or about 4 μm to about 6 μm; or about 6 μm to about 100 μm; or about 6 μm to about 90 μm; or about 6 μm to about 80 μm; or about 6 μm to about 70 μm; or about 6 μm to about 60 μm; or about 6 μm to about 50 μm; or about 6 μm to about 40 μm; or about 6 μm to about 30 μm; or about 6 μm to about 20 μm; or about 6 μm to about 15 μm; or about 6 μm to about 12 μm; or about 6 μm to about 10 μm; or about 6 μm; to about 8 μm; or about 8 μm to about 100 μm; or about 8 μm to about 90 μm; or about 8 μm to about 80 μm; or about 8 μm to about 70 μm; or about 8 μm to about 60 μm; or about 8 μm to about 50 μm; or about 8 μm to about 40 μm; or about 8 μm to about 30 μm; or about 8 μm to about 20 μm; or about 8 μm to about 15 μm; or about 8 μm to about 12 μm; or about 8 μm to about 10 μm; or about 10 μm to about 100 μm; or about 10 μm to about 90 μm; or about 10 μm to about 80 μm; or about 10 μm to about 70 μm; or about 10 μm to about 60 μm; or about 10 μm to about 50 μm; or about 10 μm to about 40 μm; or about 10 μm to about 30 μm; or about 10 μm to about 20 μm; or about 10 μm to about 15 μm; or about 10 μm to about 12 μm; or about 12 μm to about 100 μm; or about 12 μm to about 90 μm; or about 12 μm to about 80 μm; or about 12 μm to about 70 μm; or about 12

µm to about 60 µm; or about 12 µm to about 50 µm; or about 12 µm to about 40 µm; or about 12 µm to about 30 µm; or about 12 µm to about 20 µm; or about 12 µm to about 15 µm or about 15 µm to about 100 µm; or about 15 µm to about 90 µm; or about 15 µm to about 80 µm; or about 15 µm to about 70 µm; or about 15 µm to about 60 µm; or about 15 µm to about 50 µm; or about 15 µm to about 40 µm; or about 15 µm to about 30 µm; or about 15 µm to about 20 µm; or about 20 µm to about 100 µm; or about 20 µm to about 90 µm; or about 20 µm to about 80 µm; or about 20 µm to about 70 µm; or about 20 µm to about 60 µm; or about 20 µm to about 50 nm; or about 20 nm to about 40 nm; or about 20 nm to about 30 nm; or about 30 nm to about 100 nm; or about 30 nm to about 90 nm; or about 30 nm to about 80 nm; or about 30 nm to about 70 nm; or about 30 nm to about 60 nm; or about 30 nm to about 50 nm; or about 30 nm to about 40 nm; or about 40 nm to about 100 nm; or about 40 nm to about 90 nm; or about 40 nm to about 80 nm; or about 40 nm to about 70 nm; or about 40 nm to about 60 nm; or about 40 nm to about 50 nm; or about 50 to about 100; or about 50 nm to about 90 nm; or about 50 nm to about 80 nm; or about 50 nm to about 70 nm; or about 50 nm to about 60 nm; or about 60 nm to about 100 nm; or about 60 nm to about 90 nm; or about 60 nm to about 80 nm; or about 60 nm to about 70 nm; or about 70 nm to about 100 nm; or about 70 nm to about 90 nm; or about 70 nm to about 80 nm; or about 80 nm to about 100 nm; or about 80 nm to about 90 nm; or about 90 nm to about 100 nm.

When the shape of the particles is not spherical, the mean particle size is defined as $D_{50}$ measured by the laser diffraction method (ISO 13320-1). When the shape of the particles is spherical, the mean particle size is defined as the $D_{50}$ measured by either the laser diffraction method (ISO 13320-1) or the SediGraph method (ISO 13317-3).

In some embodiments, the particles have a melting temperature (Tm) of greater than 60° C., and preferably greater than 100° C. For example, the particles may have a Tm of about 61° C. to about 1,000° C.; or about 61° C. to about 750° C.; or about 61° C. to about 500° C.; or about 61° C. to about 250° C.; or about 61° C. to about 100° C.; or about 100° C. to about 1,000° C.; or about 100° C. to about 750° C.; or about 100° C. to about 500° C.; or about 100° C. to about 250° C.; or about 250° C. to about 1,000° C.; or about 250° C. to about 750° C.; or about 250° C. to about 500° C.; or about 500° C. to about 1,000° C.; or about 500° C. to about 750° C.; or about 750° C. to about 1,000° C.

When present, the compositions of the invention contain one or more particles in an amount of about 0.1 wt % to about 50 wt %, on a solid weight basis. For example, the particles may be present in an amount of about 0.1 wt % to about 45 wt %; or about 0.1 wt % to about 40 wt %; or about 0.1 wt % to about 35 wt %; or about 0.1 wt % to about 30 wt %; or about 0.1 wt % to about 25 wt %; or about 0.1 wt % to about 20 wt %; or about 0.1 wt % to about 15 wt %; or about 0.1 wt % to about 10 wt %; or about 0.1 wt % to about 5 wt %; or about 0.1 wt % to about 1 wt %; or about 0.1 wt % to about 0.5 wt %; or about 0.5 wt % to about 50 wt %; or about 0.5 wt % to about 45 wt %; or about 0.5 wt % to about 40 wt %; or about 0.5 wt % to about 35 wt %; or about 0.5 wt % to about 30 wt %; or about 0.5 wt % to about 25 wt %; or about 0.5 wt % to about 20 wt %; or about 0.5 wt % to about 15 wt %; or about 0.5 wt % to about 10 wt %; or about 0.5 wt % to about 5 wt %; or about 0.5 wt % to about 1 wt %; or about 1 wt % to about 50 wt %; or about 1 wt % to about 45 wt %; or about 1 wt % to about 40 wt %; or about 1 wt % to about 35 wt %; or about 1 wt % to about 30 wt %; or about 1 wt % to about 25 wt %; or about 1 wt % to about 20 wt %; or about 1 wt % to about 15 wt %; or about 1 wt % to about 10 wt %; or about 1 wt % to about 5 wt %; or about 5 wt % to about 50 wt %; or about 5 wt % to about 45 wt %; or about 5 wt % to about 40 wt %; or about 5 wt % to about 35 wt %; or about 5 wt % to about 30 wt %; or about 5 wt % to about 25 wt %; or about 5 wt % to about 20 wt %; or about 5 wt % to about 15 wt %; or about 5 wt % to about 10 wt %; or about 10 wt % to about 50 wt %; or about 10 wt % to about 45 wt %; or about 10 wt % to about 40 wt %; or about 10 wt % to about 35 wt %; or about 10 wt % to about 30 wt %; or about 10 wt % to about 25 wt %; or about 10 wt % to about 20 wt %; or about 10 wt % to about 15 wt %; or about 15 wt % to about 50 wt %; or about 15 wt % to about 45 wt %; or about 15 wt % to about 40 wt %; or about 15 wt % to about 35 wt %; or about 15 wt % to about 30 wt %; or about 15 wt % to about 25 wt %; or about 15 wt % to about 20 wt %; or about 20 wt % to about 50 wt %; or about 20 wt % to about 45 wt %; or about 20 wt % to about 40 wt %; or about 20 wt % to about 35 wt %; or about 20 wt % to about 30 wt %; or about 20 wt % to about 25 wt %; or about 25 wt % to about 50 wt %; or about 25 wt % to about 45 wt %; or about 25 wt % to about 40 wt %; or about 25 wt % to about 35 wt %; or about 25 wt % to about 30 wt %; or about 30 wt % to about 50 wt %; or about 30 wt % to about 45 wt %; or about 30 wt % to about 40 wt %; or about 30 wt % to about 35 wt %; or about 35 wt % to about 50 wt %; or about 35 wt % to about 45 wt %; or about 35 wt % to about 40 wt %; or about 40 wt % to about 50 wt %; or about 40 wt % to about 45 wt %; or about 45 wt % to about 50 wt %.

In some embodiments, a crosslinking agent such as ammonium zinc carbonate, ammonium zirconium carbonate, and mixtures thereof can be included in the coating compositions described herein. The inclusion of the crosslinking agent may further improve or enhance the resistance properties of the compositions, and in particular it may improve resistance when the compositions and/or articles coated with same are exposed to high temperature conditions. The amount of crosslinking agent included in the compositions may be, on a solid weight basis, about 0 wt % to about 15 wt %. Higher amounts may compromise the recyclability and repulpability of the substrate. Suitable crosslinking agents include Zinc Oxide solution #1 (ammonium zinc carbonate solution, available from BASF) and Bacote 20 (ammonium zirconium carbonate solution, available from MEL Chemicals).

Additives may be included in the coating described herein, such as, for example, defoamers, wetting agents, leveling agents, colloidal stabilizers, rheology modifiers, biocides, pesticides, surfactants, adhesion promoters, silicones, light stabilizers, de-gassing additives, waxes, ammonia, flow promoters, defoamers, antioxidants, stabilizers, dispersants, plasticizers, rheological additives, and others, and combinations thereof. In addition, other additives can be added to the coating compositions of the present invention in order to enhance the usefulness of the coating compositions or the coatings produced by curing the coating compositions. For example, plasticizers, antimicrobials, coloring agents, optical brighteners, ultraviolet absorbers, antioxidant, and the like can be incorporated into the coating compositions of the present invention, if desired. The amount of additives that may be included in the compositions may be, on a solid weight basis, about 0 wt % to about 10 wt %. For example, additives may be included in an amount of about 0.1 wt % to about 10 wt %; or about 0.1 wt % to about 5 wt %; or about 0.1 wt % to about 1 wt %; or about 0.1 wt % to about 0.5 wt %; or about 0.5 wt % to about 10 wt %; or about 0.5 wt % to about 5 wt %; or about 0.5 wt % to about 1 wt %; or about 1 wt % to about 5 wt %; or about 5 wt % to about 10 wt %.

Colorants may be included in the printing inks and coating described herein. Suitable colorants include, but are not limited to, organic or inorganic pigments and dyes. Suitable dyes include, for example, fluorescent dyes, azo dyes, anthraquinone dyes, xanthene dyes, azine dyes, and combinations thereof. Organic pigments may be one pigment or a combination of pigments, such as for instance Pigment Yellow Numbers 12, 13, 14, 17, 74, 83, 114, 126, 127, 174, 188; Pigment Red Numbers 2, 22, 23, 48:1, 48:2, 52, 52:1, 53, 57:1, 112, 122, 166, 170, 184, 202, 266, 269; Pigment Orange Numbers 5, 16, 34, 36; Pigment Blue Numbers 15, 15:3, 15:4; Pigment Violet Numbers 3, 23, 27; and/or Pigment Green Number 7.

Suitable inorganic pigments that may be included in the compositions are, for example: iron oxides, titanium dioxides, chromium oxides, ferric ammonium ferrocyanides, ferric oxide blacks, Pigment Black Number 7 and/or Pigment White Numbers 6 and 7. Other organic and inorganic pigments and dyes can also be employed, as well as combinations that achieve the desired colors.

When present, colorants may be included in the compositions of the present invention in an amount of about 0.01 wt % to about 50 wt %, based on the total weight of the composition. For example, colorants may be present in an amount of about 0.01 wt % to about 40 wt %; or about 0.01 wt % to about 30 wt %; or about 0.01 wt % to about 20 wt %; or about 0.01 wt % to about 10 wt %; or about 0.01 wt % to about 5 wt %; or about 0.01 wt % to about 1 wt %; or about 0.01 wt % to about 0.5 wt %; or about 0.01 wt % to about 0.1 wt %; or about 0.1 wt % to about 50 wt %; or about 0.1 wt % to about 40 wt %; or about 0.1 wt % to about 30 wt %; or about 0.1 wt % to about 20 wt %; or about 0.1 wt % to about 5 wt %; or about 0.1 wt % to about 1 wt %; or about 0.1 wt % to about 0.5 wt %; or about 0.5 wt % to about 50 wt %; or about 0.5 wt % to about 40 wt %; or about 0.5 wt % to about 30 wt %; or about 0.5 wt % to about 20 wt %; or about 0.5 wt % to about 10 wt %; or about 0.5 wt % to about 5 wt %; or about 0.5 wt % to about 1 wt %; or about 1 wt % to about 50 wt %; or about 1 wt % to about 40 wt %; or about 1 wt % to about 30 wt %; or about 1 wt % to about 20 wt %; or about 1 wt % to about 10 wt %; or about 1 wt % to about 5 wt %; or about 5 wt % to about 50 wt %; or about 5 wt % to about 40 wt %; or about 5 wt % to about 30 wt %; or about 5 wt % to about 20 wt %; or about 5 wt % to about 10 wt %; or about 10 wt % to about 50 wt %; or about 10 wt % to about 40 wt %; or about 10 wt % to about 30 wt %; or about 10 wt % to about 20 wt %; or about 20 wt % to about 50 wt %; or about 20 wt % to about 40 wt %; or about 20 wt % to about 30 wt %; or about 30 wt % to about 50 wt %; or about 30 wt % to about 40 wt %; or about 40 wt % to about 50 wt %.

In one aspect, the coating compositions of the present invention have a viscosity of about 10 cP to about 10,000 cP, preferably about 100 cP to about 5,000 cP, and more preferably about 500 cP to about 2,500 cP. For example, the coating compositions of the present invention may have a viscosity of about 10 cP to about 7,500 cP; or about 10 cP to about 5,000 cP; or about 10 cP to about 2,500 cP; or about 10 cP to about 1,000 cP; or about 10 cP to about 750 cP; or about 10 cP to about 500 cP; or about 10 cP to about 250 cP; or about 10 cP to about 100 cP; or about 10 cP to about 50 cP; or about 50 cP to about 10,000 cP; or about 50 cP to about 7,500 cP; or about 50 cP to about 5,000 cP; or about 50 cP to about 2,500 cP; or about 50 cP to about 1,000 cP; or about 50 cP to about 750 cP; or about 50 cP to about 500 cP; or about 50 cP to about 250 cP; or about 50 cP to about 100 cP; or about 100 cP to about 10,000 cP; or about 100 cP to about 7,500 cP; or about 100 cP to about 5,000 cP; or about 100 cP to about 2,500 cP; or about 100 cP to about 1,000 cP; or about 100 cP to about 750 cP; or about 100 cP to about 500 cP; or about 100 cP to about 250 cP; or about 250 cP to about 10,000 cP; or about 250 cP to about 7,500 cP; or about 250 cP to about 5,000 cP; or about 250 cP to about 2,500 cP; or about 250 cP to about 1,000 cP; or about 250 cP to about 750 cP; or about 250 cP to about 500 cP; or about 500 cP to about 10,000 cP; or about 500 cP to about 7,500 cP; or about 500 cP to about 5,000 cP; or about 500 cP to about 2,500 cP; or about 500 cP to about 1,000 cP; or about 500 cP to about 750 cP; or about 750 cP to about 10,000 cP; or about 750 cP to about 7,500 cP; or about 750 cP to about 5,000 cP; or about 750 cP to about 2,500 cP; or about 750 cP to about 1,000 cP; or about 1,000 cP to about 10,000 cP; or about 1,000 cP to about 7,500 cP; or about 1,000 cP to about 5,000 cP; or about 1,000 cP to about 2,500 cP.

Additional water may be added to the coating compositions of the present invention. In one aspect, water is added to adjust the viscosity of the coating composition. When added, water may be added in an amount of about 0.1 wt % to about 50 wt %, based on the total weight of the composition. For example, water may be added in an amount of about 0.1 wt % to about 40 wt %; or about 0.1 wt % to about 30 wt %; or about 0.1 wt % to about 20 wt %; or about 0.1 wt % to about 5 wt %; or about 0.1 wt % to about 1 wt %; or about 0.1 wt % to about 0.5 wt %; or about 0.5 wt % to about 50 wt %; or about 0.5 wt % to about 40 wt %; or about 0.5 wt % to about 30 wt %; or about 0.5 wt % to about 20 wt %; or about 0.5 wt % to about 10 wt %; or about 0.5 wt % to about 5 wt %; or about 0.5 wt % to about 1 wt %; or about 1 wt % to about 50 wt %; or about 1 wt % to about 40 wt %; or about 1 wt % to about 30 wt %; or about 1 wt % to about 20 wt %; or about 1 wt % to about 10 wt %; or about 1 wt % to about 5 wt %; or about 5 wt % to about 50 wt %; or about 5 wt % to about 40 wt %; or about 5 wt % to about 30 wt %; or about 5 wt % to about 20 wt %; or about 5 wt % to about 10 wt %; or about 10 wt % to about 50 wt %; or about 10 wt % to about 40 wt %; or about 10 wt % to about 30 wt %; or about 10 wt % to about 20 wt %; or about 20 wt % to about 50 wt %; or about 20 wt % to about 40 wt %; or about 20 wt % to about 30 wt %; or about 30 wt % to about 50 wt %; or about 30 wt % to about 40 wt %; or about 40 wt % to about 50 wt %.

Water miscible organic solvents may be included in the coating compositions. If so, they would preferably be present in amounts of about 0.1 wt % to about 10 wt %, based on the total weight of the composition. Examples of organic solvents include, but are not limited to, ethanol, isopropanol, N-propanol, glycols, glycol ethers and the like.

The solids content of the coating composition is preferably about 20 wt % to about 80 wt %, more preferably about 30 wt % to about 70 wt %, and most preferably about 40 wt % to about 60 wt %, based on the total weight of the composition. For example, the solids content of the coating composition may be about 20 wt % to about 70 wt %; or about 20 wt % to about 60 wt %; or about 20 wt % to about 50 wt %; or about 20 wt % to about 40 wt %; or about 20 wt % to about 30 wt %; or about 30 wt % to about 80 wt %; or about 30 wt % to about 70 wt %; or about 30 wt % to about 60 wt %; or about 30 wt % to about 50 wt %; or about 30 wt % to about 40 wt %; or about 40 wt % to about 80 wt %; or about 40 wt % to about 70 wt %; or about 40 wt % to about 60 wt %; or about 40 wt % to about 50 wt %; or about 50 wt % to about 80 wt %; or about 50 wt % to about 70 wt %; or about 50 wt % to about 60 wt %; or about 60 wt % to about 80 wt %; or about 60 wt % to about 70 wt %; or about 70 wt % to about 80 wt %.

In some embodiments, the coating composition of the present invention has one or more phases with at least one glass transition temperature (Tg) of about −50° C. to about 50° C., preferably of about −40° C. to about 30° C., and more preferably about −30° C. to about 10° C. For example, the coating composition of the present invention may have one or more phases with a Tg of about −50° C. to about 40° C.; or about −50° C. to about 30° C.; or about −50° C. to about 20° C.; or about −50° C. to about 10° C.; or about −50° C. to about 0° C.; or about −40° C. to about 50° C.; or about −40° C. to about 40° C.; or about −40° C. to about 30° C.; or about −40° C. to about 20° C.; or about −40° C. to about 10° C.; or about −40° C. to about 0° C.; or about −30° C. to about 50° C.; or about −30° C. to about 40° C.; or about −30° C. to about 30° C.; or about −30° C. to about 20° C.; or about −30° C. to about 10° C.; or about −30° C. to about 0° C.; or about −20° C. to about 50° C.; or about −20° C. to about 40° C.; or about −20° C. to about 30° C.; or about −20° C. to about 20° C.; or about −20° C. to about 10° C.; or about −20° C. to about 0° C.; or about −10° C. to about 50° C.; or about −10° C. to about 40° C.; or about −10° C. to about 30° C.; or about −10° C. to about 20° C.; or about −10° C. to about 10° C.; or about −10° C. to about 0° C.

In some embodiments, the coating composition of the present invention has one or more phases with at least one glass transition (Tg) of less than 10° C. In other embodiments, the coating composition of the present invention has one or more phases with at least one Tg of less than 0° C.

In some embodiments, the acid value of the coating composition of the present invention is about 10-150 mg KOH/g, preferably about 30-120 mg KOH/g, and more preferably 50-100 mg KOH/g. For example, the acid value of the coating composition, in mg KOH/g, may be may be about 10 to about 140; or about 10 to about 130; or about 10 to about 120; or about 10 to about 110; or about 10 to about 100; or about 10 to about 90; or about 10 to about 80; or about 10 to about 70; or about 10 to about 60; or about 10 to about 50; or about 10 to about 40; or about 10 to about 30; or about 10 to about 20; or about 20 to about 150; or about 20 to about 140; or about 20 to about 130; or about 20 to about 120; or about 20 to about 110; or about 20 to about 100; or about 20 to about 90; or about 20 to about 80; or about 20 to about 70; or about 20 to about 60; or about 20 to about 50; or about 20 to about 40; or about 20 to about 30; or about 30 to about 150; or about 30 to about 140; or about 30 to about 130; or about 30 to about 120; or about 30 to about 110; or about 30 to about 100; or about 30 to about 90; or about 30 to about 80; or about 30 to about 70; or about 30 to about 60; or about 30 to about 50; or about 30 to about 40; or about 40 to about 150; or about 40 to about 140; or about 40 to about 130; or about 40 to about 120; or about 40 to about 110; or about 40 to about 100; or about 40 to about 90; or about 40 to about 80; or about 40 to about 70; or about 40 to about 60; or about 40 to about 50; or about 50 to about 150; or about 50 to about 140; or about 50 to about 130; or about 50 to about 120; or about 50 to about 110; or about 50 to about 100; or about 50 to about 90; or about 50 to about 80; or about 50 to about 70; or about 50 to about 60; or about 60 to about 150; or about 60 to about 140; or about 60 to about 130; or about 60 to about 120; or about 60 to about 110; or about 60 to about 100; or about 60 to about 90; or about 60 to about 80; or about 60 to about 70; or about 70 to about 150; or about 70 to about 140; or about 70 to about 130; or about 70 to about 120; or about 70 to about 110; or about 70 to about 100; or about 70 to about 90; or about 70 to about 80; or about 80 to about 150; or about 80 to about 140; or about 80 to about 130; or about 80 to about 120; or about 80 to about 110; or about 80 to about 100; or about 80 to about 90; or about 90 to about 150; or about 90 to about 140; or about 90 to about 130; or about 90 to about 120; or about 90 to about 110; or about 90 to about 100; or about 100 to about 150; or about 100 to about 140; or about 100 to about 130; or about 100 to about 120; or about 100 to about 110; or about 110 to about 150; or about 110 to about 140; or about 110 to about 130; or about 110 to about 120; or about 120 to about 150; or about 120 to about 140; or about 120 to about 130; or about 130 to about 150; or about 130 to about 140; or about 140 to about 150.

In some embodiments, surface energy of the coatings contributes to the effectiveness of the liquid resistance properties. Preferably, the total surface energy is below 50 N/m. Preferably, the polar part of the surface energy is below 10 N/m.

The coating compositions of the present invention may be prepared by blending the polymer binder(s), followed by adding the particles to the blend, and adding other optional components, such as the fillers, cross-linkers and other additives and carrying out further mixing. In one preferred aspect, a defoamer/anti-foam component is added after the polymer binder(s), in order to fully disperse the defoamer and minimize foam formation. If the viscosity of the formulation is to be adjusted, then water can be added in an amount sufficient to adjust the viscosity to the desired value.

Among the substrates that are suitable to receive the coating compositions include, for example, paper, board, polymeric substrates (e.g., polyolefins such as polyethylene and polypropylene), metal, wood, and any other substrate that can receive the coatings described herein. The coated materials may be formed into printed articles exhibiting resistance to the permeation of water and other liquids. Such articles may be, for example, drinking cups. In one aspect, at least the food-contact side of the substrate of the article is coated with the coating compositions described herein, which are in compliance with government or trade association regulations, such as compliance with the pertinent regulatory rules of the United States Food and Drug Administration ("FDA"), such as for example, 21 CFR §§ 176.170 and 176.180, and BfR Recommendations XXXVI.

In some embodiments, the cellulose-based substrate has a basis weight of 80 g/m² or greater. In some embodiments, the cellulose-based substrate has a basis weight from 80 g/m² to 600 g/m². In some embodiments, the cellulose-based substrate has a basis weight from 200 g/m² to 400 g/m², which is suitable for use in a paper cup.

In some embodiments, a single layer of the water-based coating compositions of the invention are applied to the substrate. In other embodiments, more than one layer of the water-based coating compositions of the present invention are applied to the substrate. The substrates disclosed herein can comprise one or more types of coatings (e.g., two types of coatings). In some embodiments, the cellulose-based substrates disclosed herein (for instance, on the paper cups disclosed herein) can have more than one coating layer on the substrate, wherein the coating layers can comprise the same coating or different coatings.

In one aspect of the present disclosure, the coated articles comprise a substrate on which multiple coating layers are applied. In one embodiment, in a multilayer arrangement of this kind, one or more layers of the coating compositions are applied to the substrate and one or more layers of another coating composition, such as a primer composition or an overprint varnish layer, are applied. The layers may be applied in any order, e.g., a primer layer may be applied to the substrate, the liquid barrier coating composition may next be applied, and then an overprint varnish layer may be applied. In some embodiments, when multiple coatings are applied, the water-based coatings of the invention may be referred to as "water-based coating (A)." The multiple coatings can be applied using one coating station, or multiple coating stations. With such arrangements, further enhancements in the properties may be realized through the combinations of applied coating layers. Improved substrate bonding and or resistance to removal of the coatings may be realized. Improved barrier performance, e.g., resistance to the passage of water and other liquids, may be also be realized. Advantageously, the multiple layers of coatings may be applied via flexography. When the coatings are applied via flexography, it is beneficial to use multiple stations. The same or different coatings may be used in each station. In certain embodiments, different coatings may be used in each station in order to tune performance—for instance to minimize blocking of the last layer, or to adjust surface energy or printability. Thus, the outer layer may be different from the core and/or bottom layers. In general, as the number of coatings increases, the coat weight increases, and resistance to water (i.e. as indicated by a decrease in Cobb value), oil and grease (as indicated by an increase in kit level as measured using the TAPPI T559 test method), and other liquids, increases. Heat seal strength also increases with increasing coat weight.

In certain embodiments, the water-based coatings are dried on the substrate. In some embodiments, each coating is dried before applying the next coating. In other embodiments, the coatings are dried at intervals, after a specified number of coatings are applied (e.g. the coatings may be dried after every third coating, for instance after coatings 3, 6, 9, etc.). In some embodiments, all the layers of the coatings are dried simultaneously after the last coating is applied.

In some embodiments, the coated articles comprising the water-based coatings of the present invention can have a dry coat weight of 2 g/m$^2$ to 40 g/m$^2$, preferably a coat weight of 5 g/m$^2$ to 30 g/m$^2$, and more preferably a coat weight of 10 g/m$^2$ to 20 g/m$^2$. In some embodiments, the water-based coating of the present invention can be applied in an amount of less than 15% by weight based on the weight of the coated cellulose-based substrate.

In some embodiments, the coated articles comprising the water-based polymer coating of the present invention can provide a water Cobb value less than 20 g/m$^2$, at room temperature for 30 minutes. Preferably, the Cobb value is less than 10 g/m$^2$, and more preferably less than 5 g/m$^2$.

In some embodiments, the coated articles comprising the water-based coatings of the present invention can be heat sealed to another layer of coating (i.e. coating-to-coating or face-to-face), or to the blank substrate (i.e. coating-to-blank substrate, or coating-to-back, or face-to-back). The adhesion strength can be 80% or greater paper tear (see examples), when using a sealing bar at 160° C. (320° F.) at 40 psi for one second, or at 121° C. (250° F.) at 50 psi for three seconds.

In some embodiments, the coated articles comprising the water-based polymer coating disclosed herein exhibit no fiber tear and no more than a light tackiness in the roll block resistance test after being held under 50 psi pressure at 50° C. and 66% relative humidity (RH) for 24 hours.

In one aspect, the substrates comprising the water-based coating composition of the present invention are formed into packaging for food and other sensitive materials. The coatings of the present invention are safe for contacting the food and sensitive materials. The coatings of the present invention do not contain toxic and/or harmful components; and/or do not contain components that exhibit more than minimal migration into the food or sensitive material. In certain embodiments, the coatings are in compliance with government or trade association rules and regulations governing contact with food or other sensitive materials, such as the pertinent regulatory rules of the United States Food and Drug Administration ("FDA") and the Bundesinstitut für Risikobewertung (BfR) (translated as "German Federal Institute for Risk Assessment").

In one aspect of the present invention, the components of the coating compositions of the present invention are non-volatile and are listed in the regulations for indirect food additives in Title 21 of the Code of Federal Regulations (CFR). In a more particular aspect of the inventions described herein, the components of the present coating compositions can be safely used as components of the uncoated or coated food-contact surface of paper and paperboard intended for use in producing, manufacturing, packaging, processing, preparing, treating, packing, transporting, or holding aqueous and fatty foods and dried foods, pursuant to, for example, 21 CFR §§ 176.170 and 176.180. See also BfR Recommendations XXXVI.

In one aspect, the articles coated with the water-based coating compositions of the present invention are recyclable. In another aspect, the coating compositions of the present invention can be recycled in the same processes in which the substrate materials/packaging materials to which they are applied are recycled. In some embodiments, the articles coated with the water-based coating compositions of the present invention are repulpable. The articles coated with the water-based coating compositions of this invention may also be compostable.

In some embodiments, the coating compositions of the present invention can be applied on a substrate, such as paper or board, by a flexographic or gravure printing press. In other embodiments, the coating compositions can be applied on a substrate by a coating machine having a blade, an air knife, a rod, or curtain coaters. However, the coatings can be applied by any suitable method. Other methods of printing and coating include, but are not limited to, digital, inkjet, screen printing, roll coating, dip coating, spray coating, intaglio, etc.

In some embodiments, the liquid barrier coatings may be applied using converting equipment such as a flexographic or rotogravure press. A benefit of such approach is that a converter would be able to buy standard lower cost paperboard substrates from a paper mill and apply in-house the coatings necessary to impart the liquid barrier and sealing properties required to form a cup. Another benefit of this approach is that coatings may be deposited using multiple stations, whereas paper mills are generally only able to apply one of the coating layers in one pass. The ability to use multiple stations applying smaller coating bumps helps reduce the occurrence of pinholes, improve the barrier efficiency at an overall lower coat weight, and also provides the ability to tune the properties of the different layers—such as the surface properties for different applications. The coatings may be applied on a flexographic press in-line with the inks and optional overprint. Alternatively, the inks and optional overprint may be applied off-line. The coatings may be applied inline using one or more stations, preferably 2 to 8, and more preferably 3 to 6. The first coating layer may be selected such that it has an improved holdout to help minimize coating penetration for the following layers. The top layer(s) may be selected such that they impart better heat seal performance compared to the core barrier layers. In one embodiment, the top coating layer(s) may be formulated as described in WO 2018/200783, to provide enhanced sealing properties. A commercial example of such a coating is SunStar SPEF-854 (Sun Chemical), which is a repulpable coating (repulping tests show 99.8% cellulose fiber recovery according to testing by Western Michigan University) that is "OK Compost" certified when used at up to 8 wt % when combined with cellulosic substrates. Additionally, the top layer may be formulated for different applications with an adjusted coefficient of friction (CoF) to facilitate handling or with an optimized surface energy to help with printability and ink adhesion. Applying the barrier coatings using a printing process such as flexography is expected to be more efficient in terms of material consumption to achieve suitable barrier properties and enable the use of more commoditized substrates which helps reduce the cost of the barrier coated board for cost sensitive applications such as paper cups. In one embodiment, the coatings may be applied at or near room temperature. In another embodiment, the coatings may be heated (e.g, via the use of a heated sump or chamber or pumping from a heated container) to lower the application viscosity while promoting better holdout. Drying ovens will generally heat the surface of the paper substrate over 50° C. using enough air flow to evaporate the water for each coating layer and chill rollers may be needed at the end of the press to drop the web surface temperature to below 50° C.—ideally below 40° C. to minimize the risks of blocking during rewinding and subsequent storage. In another embodiment, the coating may be applied using a press equipped with a heated transfer plate or sleeve such that the liquid coating transferred from the anilox (or cylinder) roll can evaporate at least partly onto the plate before being transferred to the substrate in order to improve the holdout and uniformity of a thin coating layer—even on very porous substrates such as uncoated paperboard.

In one embodiment, printing inks are printed over a cured coating composition of the present invention. For example, after the coating composition is heated to dry the applied composition by evaporating the water (and solvent, if any), then a printing ink will be applied on top of the dry coating. In other embodiments, the coating composition is applied over the top of the inks printed on the substrate.

The coating(s) can be applied to a cellulose-based substrate to form a coated substrate, wherein the coated substrate is then formed into a paper cup. The paper cup can be formed in any manner known in the art for forming paper cups. In some embodiments, the paper cup can be prepared by (a) applying a first coating comprising a water-based polymer coating onto at least a portion of a surface of a first paper substrate; (b) applying a second water-based polymer coating onto at least a portion of a surface of a second substrate; (c) forming a side wall from one of the first paper substrate and the second paper substrate and bonding the side wall to itself along a side edge; (d) forming a bottom from one of the first paper substrate and the second paper substrate; and (e) bonding the side wall along a bottom edge to the bottom along a side edge to form the paper cup. In certain embodiments, the paper cups may be sealed in cup forming machines using hot air or ultrasonic sealing processes, or a combination of both. Advantageously, the coatings of the present invention are ideally achieving fiber-tear bond strength levels for both processes. In some embodiments, more than two coatings may be applied—for instance in the case of coatings applied via a printing process such as flexography. After drying the coating(s), it may be necessary to reduce the temperature of the substrate below 50° C., and preferably below 40° C., to avoid blocking of the rolls during rewinding or extended storage. Such cooling process may be achieved using chill rollers or by blowing cold air directly onto the web surface before rewinding.

As an alternative to cups, the coatings described herein can be used for coating paper for the production of paper bags for dry foods, such as, for example, coffee powders, soup powders; for liquids, such as, for example, cosmetics, cleaning agents, beverages; of tube laminates; of paper carrier bags; of paper laminates and co-extrudates for ice cream, confectionery (e.g., chocolate bars); of paper adhesive tape; of cardboard cups (e.g., yogurt pots); of meal trays, or meat trays; of wound cardboard containers (e.g., cans, drums); of wet-strength cartons for outer packaging (e.g., wine bottles); of fruit boxes of coated cardboard; of fast food plates; of clamp shells; of beverage cartons and cartons for liquids, such as detergents and cleaning agents, frozen food carton; of paper labels; or of flower pots and plant pots.

EXAMPLES

The following examples illustrate specific aspects of the present invention and are not intended to limit the scope thereof in any respect, and should not be so construed.

Although all the examples below were applied to the uncoated side of a Cupforma Classic 260 $g/m^2$ (Stora Enso) substrate by an RK K101 Control Coater for comparison purpose (see Examples 1 to 8), it does not exclude them from being applied to other paper or board substrates by other methods. One of skill in the art would know how to adjust the formulations for viscosity, rheology, etc. be suitable for application by other methods (e.g. flexographic printing, gravure printing, blade coating, curtain coating, rod/bar coating). In Example 9, the coating of Example 5 was applied via flexography at multiple stations.

Unless otherwise specified, all tests were performed at room temperature.

Methods

Preparation of Coating Compositions

The coatings were prepared according to the formulations in the following examples.

Application of Coating Compositions

Examples 1-4 were coated on the substrate as a single layer using K-Bar #4. Examples 5-7 were coated on the substrate twice with each layer of coating made using K-Bar #2. Both K-Bar #2 and #4 are close wound wire bars from RK PrintCoat Instruments Ltd.

Coating Example 5 was also coated via flexography, using multiple stations (see Example 9). One to four coatings were applied, with each coating being applied at a different station. Test samples were obtained after passing one, two, three, or four stations (i.e. after one, two, three, or four layers of coating were applied).

After application, the coatings were dried at 60° C. for 2 min prior to any testing.

Heat Seal Onset Temperature of Polymer Binders

Heat seal onset temperature was defined to be the temperature at which the heat seal results in 80% or more paper tear (see heat sealing test below) when the seal pressure and dwell time are kept constant at 87 psi (0.6 MPa) and 1 sec, respectively. It was measured by heat sealing samples at different temperature yet constant pressure and dwell time with a Sencorp model 12-AS/1 sealer.

Test pH

The pH was measured by an Accumet AP110 pH meter, at approximately 25° C.

Solids Content

The solids content of the coating compositions was determined based on the weight difference of the compositions before and after evaporating water and other volatile material. Evaporation was effected by heating one gram of the composition at 150° C. for 30 minutes.

Viscosity

Viscosity was measured by a Brookfield DV-2T viscometer with spindle LV-1(62) at 30 rpm, at approximately 25° C.

Acid Value

Acid value was either taken from public literature such as the technical data sheet (TDS), or measured according to the following procedures. Approximately 1 gram of sample was weighed into a clean 100 mL Erlenmeyer flask or beaker to the nearest 0.01 gram. Appropriate solvent (usually 1:1 mixture of toluene and isopropanol) was added to dissolve the sample, followed by 3-6 drops of 1% alcoholic phenolphthalein solution. The resulting solution was titrated with standardized 0.1 N alcoholic potassium hydroxide (KOH) to first pink color which lasts for 15 sec. The volume of KOH solution titrated was recorded and used to calculate the acid value.

Glass Transition Temperature (Tg) and Melting Point (Tm)

Glass transition temperature (Tg) and melting point (Tm) were either taken from public literature such as the technical data sheet (TDS), or measured by a Q2000 Differential Scanning calorimeter (DSC) from TA Instruments. Samples were heated from about −80° C. to about 200° C. at a heating rate of 10° C./min. The system was purged with nitrogen at 50 mL/min to provide an inert atmosphere. Heat flow was plotted as a function of temperature. First heating cycle was used to remove the thermal history of the samples. Data in the second or third heating cycle were analyzed and reported.

Surface Energy

To measure the surface of the coatings, the contact angles of water and diiodomethane on the coating were measured by Dynamic Absorption and Contact Angle Tester (Pocket Goniometer PGX+ (Fibro System AB)), according to TAPPI T558. Fifteen measurements were taken for each liquid as a function of time from 0.1 sec to 5 sec. Surface energy of the coating was calculated using the contact angles of the two liquids.

Foam Volume

In the aeration test in which foam volume is determined, 70 mL of coating composition was placed in a graduated cylinder and purged with air through tubing with a fritted glass tip at 100 mL/min for 5 minutes. The foam volume was recorded after stopping the purge. It is considered a pass if the percentage of foam volume over 70 mL is less than 25%.

Water Absorption

One indicator of the effectiveness of the liquid barrier properties of a coating composition is how much liquid a coated substrate will absorb in a specified amount of time. TAPPI T 441 test method was employed to measure the water absorptiveness of the coated substrate by a Cobb Sizing Tester (Testing Machines, Inc., Model 61-04). The water absorptiveness (Cobb value) is defined as the mass of water absorbed in a specific time by 1 $m^2$ of paper, board, or corrugated fiberboard under 1 cm of water. The standard test time is a period of 30 min. A Cobb value less than 20 $g/m^2$, preferably less than 10 $g/m^2$ and more preferably less than 5 $g/m^2$, is generally required for liquid packaging.

Oil and Grease Resistance

The TAPPI T559 test method (i.e. the kit test) was employed to measure the grease and oil resistance of the coatings. A drop of a mixture of castor oil, heptane, and toluene was released onto the coated substrate, and observing, after 15 seconds, whether the coated substrate had darkened. Twelve different mixtures were applied. Based on the aggressiveness of the mixtures, the mixtures were number 1 to 12 ("kit level"). The mixture 12 was the most aggressive, and mixture 1 was the least aggressive. The less castor oil in the mixture, the more aggressive the mixture. Failure is indicated by the darkening or discoloring of the coated substrate, which occurs when at least a portion of the test mixture is absorbed by the substrate. The sample kit level score is the highest numbered mixture applied without failure. Preferably, the kit level score is equal to or greater than 6.

Heat Sealing

Heat sealing performance was evaluated using a Sencorp model 12-AS/1 sealer. Coated articles can be placed face-to-face or face-to-back and sealed at various temperature, pressure and time. In Examples 1-4, the coatings were heat sealed to itself (coating-to-coating or face-to-face) or to blank substrate (coating-to-blank substrate, coating-to-back, or face-to-back) at 160° C. (320° F.), 40 psi and 1 sec. In Examples 5-7, the coatings were only heat sealed to itself (coating-to-coating) at 121° C. (250° F.), 50 psi and 3 sec. After sealing and cooling to room temperature, an Instron tensiometer (Model 3342) was used to measure the force required to break the 1 inch wide heat sealed sample at a pulling speed of 10 inch/min (25.4 cm/min). When the heat seal is pulled apart, it can be a result of paper tear, cohesion failure (coating-coating delamination) or adhesion failure (coating-substrate delamination). The results are expressed in gf/in (1 gf/in=0.0038608858 N/cm) necessary to pull apart the heat seal, or in percentage of the area of the sample that is a paper tear. It is desirable that a heat seal is not easily pulled apart (i.e. delaminated). Ideally, the paper substrate will tear before the heat seal is pulled apart. In the present case, 80% or more paper tear is preferred, which would be observed when the sealing strength was above 400 gf/in, while delamination of the coating would be observed when the sealing strength was below 400 gf/in. 100% paper tear is usually observed when the sealing strength was above 500 gf/in.

Roll Block Resistance

Coated substrates are often stored in stacks or rolls prior to use. It is desirable that the layers of substrate do not stick together. The property of a coating to not stick to other layers of substrate is block resistance. In the case of block resistance, it is desirable that the layers can be pulled apart before the substrate tears. Thus, a smaller force necessary to apply before the layers pull apart is desired. Roll block resistance was evaluated by conditioning the sample at 50° C., 50 psi and 66% relative humidity (RH) for 24 hrs. Coated articles can be placed face-to-face or face-to-back. Afterwards, an Instron tensiometer (Model 3342) was used to measure the force required to break the 1 inch wide sample at a pulling speed of 10 inch/min. The results are expressed in gf/in or percentage of paper tear per area. 80% or more paper tear is considered a failure in the test.

Examples 1 to 4. Inventive and Comparative Coating Compositions

Inventive Examples 1 and 2, and comparative Examples 3 and 4, were prepared according to the formulations shown in Table 1A. Amounts in Table 1A are expressed as wt %, based on the total weight of the coating composition.

TABLE 1A

Formulations of Examples 1 to 4

| Components | Description | Ex. 1 (Inv.) | Ex. 2 (Inv.) | Ex. 3 (Comp.) | Ex. 4 (Comp.) |
|---|---|---|---|---|---|
| Joncryl DFC 3030 | (Meth)acrylic copolymer dispersion | 62.32 | | 49.96 | |
| Neocryl A-2092 | | | 87.72 | | 71.81 |
| Joncryl HR 1620 | | | | 33.55 | |
| Tykote 6160 | | 25.31 | | | 10.22 |
| Rovene 4019 | Styrene-butadiene copolymer dispersion | 4.87 | | 13.68 | 10.66 |
| BYK-016 | Defoamer | | | 1.23 | |
| Surfynol DF-695 | | 0.37 | 0.35 | | 0.24 |
| BYK-3410 | Wetting agent | | | 0.59 | 0.85 |
| Hydropalat WE 3475 | | | 0.91 | | |
| Aquacer 497 | Wax | | | | 4.45 |
| AquaBead 425E | | 0.60 | | | |
| HAR T77 | Talc | 2.68 | 8.77 | | |
| Rheolate 125 | Thickener | 0.2 | | | 0.98 |
| Water | | 2.88 | 1.96 | 0.99 | |
| Ammonia (5.9%) | | 0.77 | 0.29 | | 0.79 |
| Total | | 100.00 | 100.00 | 100.00 | 100.00 |

The solids content of the components of Examples 1 to 4, based on a solids weight basis, is shown in Table 1B. The amount of each solid component is expressed as wt %, based on the total weight of the solids in the coating composition.

TABLE 1B

Solids content of Examples 1 to 4

| Components | Ex. 1 (Inv.) | Ex. 2 (Inv.) | Ex. 3 (Comp.) | Ex. 4 (Comp.) |
|---|---|---|---|---|
| (Meth)acrylic copolymer(s), solid weight basis | 87.73 | 80.79 | 80.34 | 80.80 |
| Styrene-butadiene copolymer(s), solid weight basis | 5.43 | 0 | 15.71 | 11.78 |
| Talc, solid weight basis | 5.64 | 17.19 | 0 | 0 |
| Waxes, solid weight basis | 0.32 | 0 | 0 | 4.64 |
| Other additives, solid weight basis | 0.88 | 2.02 | 3.95 | 2.78 |
| Total (Solid Weight Basis) | 100.00 | 100.00 | 100.00 | 100.00 |

The properties of Examples 1 to 4 are shown in Table 1C. Where multiple Tg and/or Tm values are listed in Table 1C, it means that the coating has multiple phases.

TABLE 1C

Properties of coating Examples 1 to 4

| | | Ex. 1 (Inv.) | Ex. 2 (Inv.) | Ex. 3 (Comp.) | Ex. 4 (Comp.) |
|---|---|---|---|---|---|
| pH | | 8.7 | 8.7 | 9.5 | 8.8 |
| Solids content (%) | | 47.5 | 51.0 | 46.1 | 48.0 |
| Viscosity (cP) | | 823 | 840 | 1061 | 1073 |
| Acid value (mg KOH/g) | | 58 | 57 | 75 | 55 |
| Tg (° C.) | | −25.4, 16.2 | 4.6 | −30.4 | 5.5 |
| Tm (° C.) | | >100 | >100 | N/A | 41.7, 54.2 |
| Surface energy (N/m) | Dispersion | 38.05 | 42.54 | 38.47 | 31.94 |
| | Polar | 2.34 | 5.03 | 5.08 | 0.05 |
| | Total | 40.4 | 47.56 | 43.55 | 31.99 |
| Foam volume % | | 18 | 3 | 37 | 7 |
| Coat weight (g/m$^2$) | | 19 | 19 | 16 | 16 |
| Cobb (g/m$^2$, 30 min cold water) | | 7.8 | 5.8 | 23.5 | 10.3 |
| Heat seal strength (gf/in, coating-to-coating; or percent of samples exhibiting paper tear) | | 100% Paper tear | 100% Paper tear | 347 | 100% Paper tear |
| Heat seal strength (gf/in, coating-to-back; or percent of samples exhibiting paper tear) | | 100% Paper tear | 100% Paper tear | 50 | 100% Paper tear |

TABLE 1C-continued

Properties of coating Examples 1 to 4

|  | Ex. 1 (Inv.) | Ex. 2 (Inv.) | Ex. 3 (Comp.) | Ex. 4 (Comp.) |
|---|---|---|---|---|
| Block resistance (gf/in, coating-to-coating; or percent of samples exhibiting paper tear) | 0 | 10 | 8 | 100% Paper tear |
| Block resistance (gf/in, coating-to-back; or percent of samples exhibiting paper tear) | 0 | 43 | 33 | 33 |

The data in Table 1C show that the inventive coating compositions Examples 1 and 2, with at least one particle having an average size of greater than 4 μm, perform better than comparative Examples 3 and 4 in the Cobb test. Comparative Example 3 failed in the heat seal test, and comparative Example 4 failed in the block resistance test in the coating-to-coating direction.

Examples 5 to 7. Inventive and Comparative Coating Compositions

Inventive Examples 5 and 6, and comparative Example 7 were prepared according to the formulations in Table 2A.

TABLE 2A

Formulations of Examples 5 to 7

| Components | Description | Ex. 5 (Inv.) | Ex. 6 (Inv.) | Ex. 7 (Comp.) |
|---|---|---|---|---|
| Neocryl A-2092 | (Meth)acrylic copolymer dispersion | 56.00 | 56.57 | 56.84 |
| Joncryl DFC 3050 |  | 18.47 |  | 18.75 |
| Rovene 4019 | Styrene-butadiene copolymer dispersion |  | 36.49 | 17.74 |
| L8053 |  | 17.48 |  |  |
| Surfynol DF-695 | Defoamer | 0.29 | 0.29 | 0.29 |
| Hydropalat WE 3475 | Wetting agent | 0.51 | 0.52 | 0.52 |
| Hydrocer 357 | Wax | 4.69 | 4.76 |  |
| Hydrocarb PG3 | CaCO3 |  |  | 4.76 |
| Rheolate 125 | Thickener |  |  | 0.60 |
| Natrosol 250 H4R PA |  | 0.1 | 0.1 |  |

TABLE 2A-continued

Formulations of Examples 5 to 7

| Components | Description | Ex. 5 (Inv.) | Ex. 6 (Inv.) | Ex. 7 (Comp.) |
|---|---|---|---|---|
| Water |  | 2.21 | 1.02 | 0.25 |
| Ammonia (5.9%) |  | 0.25 | 0.25 | 0.25 |
| Total |  | 100.00 | 100.00 | 100.00 |

The solids content of the components of Examples 5 to 7, based on a solids weight basis, is shown in Table 2B. The amount of each solid component is expressed as wt %, based on the total weight of the solids in the coating composition.

TABLE 2B

Solids content of Examples 5 to 7

| Components | Ex. 5 (Inv.) | Ex. 6 (Inv.) | Ex. 7 (Comp.) |
|---|---|---|---|
| (Meth)acrylic copolymer(s), solid weight basis | 74.79 | 54.16 | 72.27 |
| Styrene-butadiene copolymer(s), solid weight basis | 18.58 | 39.40 | 19.02 |
| CaCO3, solid weight basis | 0 | 0 | 7.03 |
| Waxes, solid weight basis | 4.99 | 4.85 | 0 |
| Other additives, solid weight basis | 1.64 | 1.59 | 1.68 |
| Total (Solid Weight Basis) | 100.00 | 100.00 | 100.00 |

The properties of Examples 5 to 7 are shown in Table 2C.

TABLE 2C

Properties of Examples 5 to 7

| Components | Description | Ex. 5 (Inv.) | Ex. 6 (Inv.) | Ex. 7 (Comp.) |
|---|---|---|---|---|
|  | pH | 8.2 | 8.1 | 8.2 |
|  | Solids content (%) | 45.8 | 48.4 | 48.0 |
|  | Viscosity (cP) | 980 | 1313 | 913 |
|  | Acid value (mg KOH/g) | 46 | 38 | 46 |
|  | Tg (° C.) | −40.1, 4.1 | 3.9 | −46.1, −24.4, 12.2 |
|  | Tm (° C.) | 114.9 | 114.2 | N/A |
| Surface energy (N/m) | Dispersion | 41.35 | 40.61 | 38.05 |
|  | Polar | 6.8 | 8.79 | 6.67 |
|  | Total | 48.15 | 49.4 | 44.72 |
|  | Foam volume % | 6.7 | 5.7 | 20 |
|  | Coat weight (g/m²) | 10 | 13 | 14 |
|  | Cobb (g/m², 30 min cold water) | 6.7 | 11.5 | 4.7 |
|  | Heat seal strength (gf/in, coating-to-coating; or percent of samples exhibiting paper tear) | 100% Paper tear | 80% Paper tear | 80% Paper tear |

TABLE 2C-continued

Properties of Examples 5 to 7

| Components | Description | Ex. 5 (Inv.) | Ex. 6 (Inv.) | Ex. 7 (Comp.) |
|---|---|---|---|---|
| Block resistance (gf/in, coating-to-coating; or percent of samples exhibiting paper tear) | | 0 | 260 | 80% Paper tear |

The data in Table 2C show that the inventive coating compositions Examples 5 and 6, with at least one particle having an average size of greater than 4 nm, provide 80% or more paper tear in the heat seal test, with a minimum of block. On the other hand, the comparative Example 7 failed in the block resistance test.

Example 8. Physical Properties of Components Used in the Formulations

The physical properties of the polymer binder components used in formulating Inventive Examples 1-2 and 5-6, and Comparative Examples 3-4 and 7 are shown in Table 3.

TABLE 3

Physical properties of polymer binder components

| | Solids content (%) | Viscosity (cP) | Tg (° C.) | Acid value (mg KOH/g) | Heat seal onset temp. (° C.) | Surface Energy (N/m) | | |
|---|---|---|---|---|---|---|---|---|
| | | | | | | Dispersion | Polar | Total |
| Joncryl DFC 3030 | 46.5-48.0 | 500-1,800 | −27 | 64 | 170 | 38.17 | 8.48 | 46.65 |
| Neocryl A-2092 | 46.0-48.0 | 250-650 | 9.3 | 57 | 150 | 42.12 | 8.23 | 50.35 |
| Joncryl HR 1620 | ~40.6 | ~200 | −39.5 | 94 | >200 | 32.22 | 6.24 | 38.46 |
| Joncryl DFC 3050 | 47.4-48.6% | 400-1,000 | 99 | 49 | >200 | 44.82 | 1.09 | 45.91 |
| Tykote 6160 | 48.0-50.0 | ~1000 | +7 | 45 | 130 | 44.08 | 8.06 | 52.14 |
| Rovene 4019 | 52.0-54.0 | 150-850 | +14 | 11 | 110 | 44.77 | 15.85 | 60.6 |
| L8053 | ~50 | ~250 | −42 | 12 | 110 | NA | NA | NA |

NA = not available

The physical properties of the particles used in formulating Inventive Examples 1-2 and 5-6, and Comparative Examples 3-4 and 7 are shown in Table 4.

TABLE 4

Characteristics of the particle components

| | Type | Shape | Solids content (%) | Mean Particle Size (μm) | Melting Point (° C.) |
|---|---|---|---|---|---|
| HAR T77 | Talc | Lamellar | 100 | 10.5 | >800 |
| Hydrocarb PG3 | Calcium carbonate | Spherical | 100 | 3.2 | >800 |
| Aquacer 497 | Paraffin wax | Spherical | 50 | <1 | 60 |
| AquaBead 425E | Carnauba wax | Spherical | 24-26 | <0.5 | 82 |
| Hydrocer 357 | High density polyethylene wax | Spherical | 50 | 8-10 | 110-120 |

The particle size as measured by SediGraph and Laser Diffraction, and lamellarity index, for the lamellar talc particle HAR T77 are shown in Table 5.

TABLE 5

Particle size and lamellarity index of HAR T77

|  | $D_{50}$ SediGraph (μm) | $D_{95}$ SediGraph (μm) | $D_{50}$ Laser Diffraction (μm) | $D_{95}$ Laser Diffraction (μm) | Lamellarity Index |
|---|---|---|---|---|---|
| HAR T77 | 2.0 | 11.3 | 10.5 | 34.2 | 4.25 |

Example 9. Coating Via Flexography Using Multiple Stations

Coating Example 5 was coated via flexography, using multiple coating stations. Test samples were taken after passing station one, two, three, and four passes (i.e. coating layers). The test results are shown in Table 6.

TABLE 6

Properties of Example 5 when coated by flexography with multiple stations

| Coating | Example 5 Passing | | | |
|---|---|---|---|---|
|  | 1 | 2 | 3 | 4 |
| Dry Coat Weight (g/m2) | 5 | 8 | 10 | 13 |
| Cobb (g/m², 30 min cold water) | 73 | 17 | 7 | 7 |
| Cobb (g/m², 30 min 60° C. water) | 52 | 14 | 9 | 8 |
| Heat seal strength (gf/in, 180° C. coating-to-coating; or percent of samples exhibiting paper tear; 200° C. 40 psi, 1 sec) | 80% 100% Paper tear | 100% Paper tear 100% Paper tear | 100% Paper tear 100% Paper tear | 100% Paper tear 100% Paper tear |
| Heat seal strength (gf/in, 180° C. coating-to-back; or percent of samples exhibiting paper tear, 200° C. 40 psi, 1 sec) | 104 69 | 100% Paper tear 80% Paper tear | 100% Paper tear 100% Paper tear | 100% Paper tear 100% Paper tear |
| Block resistance (gf/in, coating-to-coating; or percent of samples exhibiting paper tear; 40° C., 70 psi, 24 hrs) | No Block | No Block | No Block | No Block |
| Block resistance (gf/in, coating-to-back; or percent of samples exhibiting paper tear; 40° C., 70 psi, 24 hrs) | No Block | No Block | No Block | No Block |
| Kit Level | 1 | >12 | >12 | >12 |

The data in Table 6 show that as the number of coating layers increases (i.e. passing 1 to 4 stations), the coat weight increases, and water, as well as oil and grease, resistance increases.

The data generally show that polymer-based aqueous coating compositions comprising at least one polymer binder with a Tg of less than 10° C., at least one polymer binder with a heat seal onset temperature of less than 200° C., and at least one particle with an average size greater than 4 μm, particularly when the melting temperature is greater than 60° C., provide improved liquid barrier properties, while maintaining the balance between heat seal strength and block resistance.

The present invention has been described in detail, including the preferred embodiments thereof. However, it will be appreciated that those skilled in the art, upon consideration of the present disclosure, may make modifications and/or improvements on this invention that fall within the scope and spirit of the invention.

What is claimed:

1. A water-based coating composition, comprising:
   a) one or more polymer binders, in an amount of 35 wt % to 95 wt %, on a solids weight basis; and
   b) one or more particles, in an amount of 0.1 wt % to 50 wt %, on a solids weight basis;
   wherein at least one of the one or more polymer binders has a glass transition temperature (Tg) of less than 10° C.;
   wherein at least one of the one or more polymer binders has a heat seal onset temperature of less than 200° C.;
   wherein at least one of the one or more particles comprise one or more talc particles having a mean particle size of 10 to 100 μm;
   wherein the water-based coating composition, when dried on a substrate, forms a 1 inch wide, coating-to-coating heat seal with a sealing strength above 400 gf/in; and
   wherein the coating-to-coating heat seal with a sealing strength above 400 gf/in. is formed by heating the coating, when dried on a substrate, at 160° C. (320° F.) and 40 psi for 1 sec, or 121° C. and 50 psi for 3 sec;
   wherein the water-based coating composition comprises a solids content of 30 wt % to 70 wt %.

2. The water-based coating composition of claim 1, wherein the one or more polymer binders further comprise at least one polymer binder with a glass transition temperature (Tg) of −50° C. to 50° C.; and/or wherein the one or more polymer binders further comprise at least one polymer binder with a Tg of 0° C. to 200° C.; wherein the one or more polymer binders comprise at least one polymer binder with a heat seal onset temperature of 0° C. to 200° C.; and/or wherein the one or more polymer binders comprise at least one polymer binder with a Tg of less than 0° C.; wherein at least one of the one or more polymer binders has an acid number of 10 mg KOH/g to 150 mg KOH/g; and/or wherein at least one of the one or more particles has a melting temperature (Tm) of greater than 60° C.

3. The water-based coating composition of claim 1, wherein the one or more talc particles have a lamellarity index of greater than 2.8; and/or wherein the one or more talc particles have a specific surface area of 10 m²/g to 30 m²/g.

4. The water-based coating composition of claim 3, wherein the one or more polymer binders further comprise a styrene-butadiene copolymer.

5. The water-based coating composition of claim 4, wherein the styrene-butadiene copolymer has a glass transition temperature (Tg) of −30° C. to 30° C.

6. The water-based coating composition of claim 1, wherein the water-based coating composition further comprises a glass transition temperature (Tg) of −50° C. to 50° C.; an acid value of 10 mg KOH/g to 150 mg KOH/g; a solids content of 40 wt % to 60 wt %; a viscosity of 10 cP to 10,000 cP; and a total surface energy of less than 50 N/m.

7. The water-based coating composition of claim 6, wherein the acid value of the water-based coating composition is 30 mg KOH/g to 120 mg KOH/g.

8. A method of coating a substrate, comprising the steps of:
   a) applying the water-based coating composition of claim 1 on a substrate; and
   b) drying the water-based coating composition on the substrate.

9. The method of claim 8, wherein the substrate is a cellulosic substrate.

10. The method of claim 8, wherein a single layer of the water-based coating composition is applied to the substrate;

or wherein more than one layer of the water-based coating composition is applied to the substrate.

11. A coated substrate prepared by the method of claim 8.

12. The coated substrate of claim 11, wherein the Cobb value of water absorption is less than or equal to 20 g/m2 per 30 minutes; and/or wherein a face-to-face heat seal, when made with a sealing bar at 160° C. and 40 psi for 1 sec provides adhesion to the extent of equal to or greater than 80% paper tear; and/or wherein a face-to-back heat seal, when made with a sealing bar at 160° C. and 40 psi for 1 sec provides adhesion to the extent of equal to or greater than 80% paper tear; and/or wherein a face-to-face heat seal, when made with a sealing bar at 121° C. and 50 psi for 3 sec provides adhesion to the extent of equal to or greater than 80% paper tear; and/or wherein a face-to-back heat seal, when made with a sealing bar at 121° C. and 50 psi for 3 sec provides adhesion to the extent of equal to or greater than 80% paper tear; and/or wherein when the coated samples placed face-to-face are conditioned at 50° C., 50 psi and 66% relative humidity (RH), provide roll block resistance to the extent of less than 80% paper tear; and/or wherein when the coated samples placed face-to-back are conditioned at 50° C., 50 psi and 66% relative humidity (RH), provide roll block resistance to the extent of less than 80% paper tear.

13. An article comprising the coated substrate of claim 11.

14. A method of coating a substrate, comprising:
a) providing a substrate;
b) applying two or more coatings to the substrate via flexography;
wherein more than one coating station is used for applying the coatings;
wherein the same or a different coating may be applied at each station;
wherein at least one coating is:
the water-based coating of claim 1.

15. The method of claim 14, wherein the coatings are dried on the substrate; and wherein each coating is dried before applying the next coating; or wherein the coatings are dried at intervals, after a specified number of coatings are applied; or wherein the coatings are dried simultaneously after the last coating is applied.

16. The method of claim 14, wherein the substrate is a cellulosic substrate.

17. A coated substrate prepared by the method of claim 14.

18. The coated substrate of claim 17, wherein the Cobb value of water absorption is less than or equal to 20 g/m2 per 30 minutes; and/or wherein the "kit level" oil and grease resistance, measured according to the TAPPI T559 test protocol, is equal to or greater than 6; and/or wherein a face-to-face heat seal, when made with a sealing bar at 160° C. and 40 psi for 1 sec provides adhesion to the extent of equal to or greater than 80% paper tear; and/or wherein a face-to-back heat seal, when made with a sealing bar at 160° C. and 40 psi for 1 sec provides adhesion to the extent of equal to or greater than 80% paper tear; and/or wherein a face-to-face heat seal, when made with a sealing bar at 121° C. and 50 psi for 3 sec provides adhesion to the extent of equal to or greater than 80% paper tear; and/or wherein a face-to-back heat seal, when made with a sealing bar at 121° C. and 50 psi for 3 sec provides adhesion to the extent of equal to or greater than 80% paper tear; and/or wherein when the coated samples placed face-to-back are conditioned at 50° C., 50 psi and 66% relative humidity (RH), provide roll block resistance to the extent of less than 80% paper tear.

* * * * *